(12) United States Patent
DeAngelis et al.

(10) Patent No.: US 12,161,946 B2
(45) Date of Patent: Dec. 10, 2024

(54) MOTION SIMULATOR FAULT TOLERANT LOAD CARRYING PIVOT CONNECTION

(71) Applicant: Moog Inc., East Aurora, NY (US)

(72) Inventors: Richard DeAngelis, Derby, NY (US); Willem A. De Graaf, The Hague (NL)

(73) Assignee: Moog Inc., East Aurora, NY (US)

( * ) Notice: Subject to any disclaimer, the term of this patent is extended or adjusted under 35 U.S.C. 154(b) by 391 days.

(21) Appl. No.: 17/776,779

(22) PCT Filed: Nov. 13, 2020

(86) PCT No.: PCT/US2020/060613
§ 371 (c)(1),
(2) Date: May 13, 2022

(87) PCT Pub. No.: WO2021/101818
PCT Pub. Date: May 27, 2021

(65) Prior Publication Data
US 2022/0395758 A1    Dec. 15, 2022

Related U.S. Application Data

(60) Provisional application No. 62/937,705, filed on Nov. 19, 2019.

(51) Int. Cl.
*A63G 31/16* (2006.01)
*F16C 11/06* (2006.01)
*G09B 9/14* (2006.01)

(52) U.S. Cl.
CPC .............. *A63G 31/16* (2013.01); *F16C 11/06* (2013.01); *G09B 9/14* (2013.01)

(58) Field of Classification Search
CPC ........ A63G 31/00; A63G 31/02; A63G 31/14; A63G 31/16; G09B 9/00; G09B 9/12; G09B 9/14; G16C 11/06
(Continued)

(56) References Cited

U.S. PATENT DOCUMENTS 4,808,023 A    2/1989  Arnold et al.
6,330,995 B1  12/2001  Mangeiga et al.
(Continued)

FOREIGN PATENT DOCUMENTS

CN    101813139 A    8/2010
EP      2941765 A1   11/2015
(Continued)

OTHER PUBLICATIONS

European Patent Office (ISA/EP), International Search Report and Written Opinion in PCT/US2020/060613, dated Mar. 3, 2021: 13 pages.

*Primary Examiner* — Kien T Nguyen
(74) *Attorney, Agent, or Firm* — Harter Secrest & Emery LLP

(57) ABSTRACT

A motion simulator comprising a base (102), a platform (104), and a plurality of linear actuators (108) connecting the base and platform via a joint having at least two degrees of freedom, the joint (15) comprising an actuator clevis comprising first and second side lugs having first and second lug openings retaining a clevis pin, an anchor clevis retaining an axel comprising first and second axel fault retaining protrusions and an axel opening receiving the clevis pin and having primary and secondary axel passage sections, the first side lug opening, pin and first axel fault retaining protrusion having a primary lug radial clearance difference between a primary inner radius of the first lug opening and an outer radius of the pin that is less than a secondary lug radial clearance difference between a secondary lug inner radius of the first lug opening and a retaining outer radius of the first axel fault retaining protrusion.

26 Claims, 13 Drawing Sheets

(58) Field of Classification Search
USPC .......................... 472/59–61, 130; 434/29, 55
See application file for complete search history.

(56) References Cited

U.S. PATENT DOCUMENTS

| | | | |
|---|---|---|---|
| 6,431,987 B1* | 8/2002 | Tushar | F16C 11/06 403/114 |
| 9,624,966 B1 | 4/2017 | Obleman et al. | |
| 2010/0210367 A1 | 8/2010 | Mondragon-Parra et al. | |
| 2011/0208187 A1 | 8/2011 | Wong | |
| 2012/0087718 A1 | 4/2012 | Long | |
| 2012/0180593 A1* | 7/2012 | Alet | B25J 17/0266 74/490.07 |
| 2015/0323414 A1* | 11/2015 | In | G01M 17/007 73/11.07 |
| 2016/0140862 A1 | 5/2016 | Van Lookeren Campagne et al. | |
| 2017/0240249 A1* | 8/2017 | Shield | B63B 21/24 |

FOREIGN PATENT DOCUMENTS

| | | | |
|---|---|---|---|
| JP | S60241522 | A | 11/1985 |
| JP | 2001336520 | A | 12/2001 |
| JP | 2005513362 | A | 5/2005 |
| WO | 03050427 | A1 | 6/2003 |

\* cited by examiner

MOTION SIMULATOR FAULT TOLERANT LOAD CARRYING PIVOT CONNECTION

TECHNICAL FIELD

The present invention relates generally to the field of motion simulator load carrying connections, and more specifically to a motion simulator load carrying connection having at least two degrees of freedom and fault tolerance.

BACKGROUND ART

Motion simulators are well known in the art. A Stewart platform (hexapod) is a known form of simulator which moves a load bearing platform relative to a fixed base. Hexapods have six linear actuators arranged to move the platform in six degrees of freedom (three linear, three rotational) relative to the base depending on which actuators are used in combination. The translational degrees of freedom are commonly known as surge (horizontal movement in the direction of travel), sway (horizontal movement perpendicular to the direction of travel) and heave (vertical motion). The rotational degrees of freedom are commonly known as roll (rotation about an axis parallel to the direction of travel), pitch (rotation about a horizontal axis perpendicular to the direction of travel) and yaw (rotation about a vertical axis).

The actuators are connected to the load bearing platform and the fixed base, respectively, by universal joints, such as a cardan joint or a spherical joint. The term "universal joint" denotes a joint having at least two rotational degrees of freedom. Alternatively, the connection joint could be a joint constrained in all but one rotational degree of freedom (i.e., a hinge joint).

SUMMARY

With parenthetical reference to the corresponding parts, portions or surfaces of the disclosed embodiment, merely for the purposes of illustration and not by way of limitation, the present invention provides a motion simulator (100) comprising: a base (102); a platform (104); a plurality of linear actuators (108a, 108b, 108c, 108d, 108e, 108f) through which the platform is connected to the base; the plurality of linear actuators controllable to move the platform relative to the base in at least two degrees of freedom; at least one of the plurality of linear actuators connected to the platform by a platform joint (15) having at least two degrees of freedom; the platform joint having a first pivot axis (20) and a second pivot axis (23) intersecting the first pivot axis, the platform joint comprising an actuator clevis (18), a clevis pin (19) orientated about the first pivot axis (20) and retained by the actuator clevis, an anchor clevis (21), and an axel (22) orientated about the second pivot axis (23) and retained by the anchor clevis; the axel comprising an axel opening (24) orientated about the first pivot axis and configured to receive the clevis pin, the axel opening having a primary axel passage section (38) defined by a primary axel inner radius (42), a first secondary axel passage section (39a) defined by a first secondary axel inner radius (43a, 44a), and a second secondary axel passage section (39b) defined by a second secondary axel inner radius (43b, 44b); the actuator clevis having a first side lug (25a) and a second side lug (25b); the clevis pin extending between the first side lug and the second side lug of the actuator clevis; the axel extending between the first side lug and the second side lug of the actuator clevis and configured to rotate about the first pivot axis (20) relative to the actuator clevis (18) and to rotate about the second pivot axis (23) relative to the anchor clevis (21); the axel comprising a first axel fault retaining protrusion (40a) having a first retaining outer radius (45a) and a first retaining inner radius (43a); the axel comprising a second axel fault retaining protrusion (40b) having a second retaining outer radius (45b) and a second retaining inner radius (43b); the first side lug comprising a first side lug opening (26a) orientated about the first pivot axis and configured to receive the clevis pin and the first axel fault retaining protrusion of the axel, the first side lug opening having a first primary lug passage section (28a) defined by a first primary lug inner radius (30a) and a first secondary lug passage section (29a) defined by a first secondary lug inner radius (31a); the first side lug opening (26a), clevis pin (19) and first axel fault retaining protrusion (40a) configured such that a first primary lug radial clearance difference (clearance A) between the first primary lug inner radius (30a) of the first lug opening (26a) and an outer radius (32) of the clevis pin (19) is less than a first outer secondary lug radial clearance difference (clearance E) between the first secondary lug inner radius (31a) of the first lug (25a) and the first retaining outer radius (45a) of the first axel fault retaining protrusion (40a).

The first side lug opening (26a), clevis pin (19) and first axel fault retaining protrusion (40a) may be configured such that the first primary lug radial clearance difference (clearance A) between the first primary lug inner radius (30a) of the first lug opening (26a) and the outer radius (32) of the clevis pin (19) is less than a first inner secondary lug radial clearance difference (clearance C) between the first retaining inner radius (43a) of the first axel fault retaining protrusion (40a) and the outer radius (32) of the clevis pin (19).

The first side lug opening (26a), clevis pin (19) and first axel fault retaining protrusion (40a) may be configured such that the first primary lug radial clearance difference (clearance A) between the first primary lug inner radius (30a) of the first lug opening (26a) and the outer radius (32) of the clevis pin (19) is less than a first secondary axel radial clearance difference (clearance D) between the first secondary axel inner radius (44a) of the axel opening (24) and the outer radius (32) of the clevis pin (19).

The first side lug opening (26a), clevis pin (19) and first axel fault retaining protrusion (40a) may be configured such that the first primary lug radial clearance difference (clearance A) between the first primary lug inner radius (30a) of the first lug opening (26a) and the outer radius (32) of the clevis pin (19) is substantially equal to a primary axel radial clearance difference (clearance B) between the primary axel inner radius (42) of the axel opening (24) and the outer radius (32) of the clevis pin (19).

The first side lug opening (26a) and the axel (22) may be configured such that the primary axel radial clearance difference (clearance B) between the primary axel inner radius (42) of the axel opening (24) and the outer radius (32) of the clevis pin (19) is less than the first inner secondary lug radial clearance difference (clearance C) between the first retaining inner radius (43a) of the first axel fault retaining protrusion (40a) and the outer radius (32) of the clevis pin (19). The first side lug opening (26a) and the axel (22) may be configured such that a primary axel radial clearance difference (clearance B) between the primary axel inner radius (42) of the axel opening (24) and the outer radius (32) of the clevis pin (19) is less than a first secondary axel radial clearance difference (clearance D) between the first secondary axel inner radius (44a) of the axel opening (24) and the outer radius (32) of the clevis pin (19). The first primary lug passage section (28a) and the clevis pin (19) may comprise a single unitary formed member such that the first primary lug radial clearance difference (clearance A) between the first primary lug inner radius of the first lug opening and the outer radius of the clevis pin is zero.

The primary axel inner radius (42) of the axel opening (24) may be less than the first secondary axel inner radius (43a, 44a) of the axel opening (24), and the second secondary axel inner radius (43b, 44b) of the axel opening (24) may be substantially equal to the first secondary axel inner radius (43a, 44a) of the axel opening (24).

The second side lug (25b) may comprises a second side lug opening (26b) orientated about the first pivot axis (20) and configured to receive the clevis pin (19) and the second axel fault retaining protrusion (40b) of the axel (22), the second side lug opening (26b) may have a second primary lug passage section (28b) defined by a second primary lug inner radius (30b) and a second secondary lug passage section (29b) defined by a second secondary lug inner radius (31b); the second side lug opening (26b), clevis pin (19) and second axel fault retaining protrusion (40b) may be configured such that a second primary lug radial clearance difference between the second primary lug inner radius (30b) of the second lug opening (26b) and an outer radius (32) of the clevis pin (19) is less than a second outer secondary lug radial clearance difference between the second secondary lug inner radius (31b) of the second lug (25b) and the second retaining outer radius (45b) of the second axel fault retaining protrusion (40b). The second side lug opening (26b), clevis pin (19) and second axel fault retaining protrusion (40b) may be configured such that the second primary lug radial clearance difference between the second primary lug inner radius (30a) of the second lug opening (26a) and the outer radius (32) of the clevis pin (19) is less than a second inner secondary lug radial clearance between the second retaining inner radius (43b) of the second axel fault retaining protrusion (40b) and the outer radius (32) of the clevis pin (19). The second side lug opening (26b), clevis pin (19) and second axel fault retaining protrusion (40b) may be configured such that the second primary lug radial clearance difference between the second primary lug inner radius (30b) of the second lug opening (26b) and the outer radius (32) of the clevis pin (19) is less than a second secondary axel radial clearance difference between the second secondary axel inner radius (44b) of the axel opening (24) and the outer radius (32) of the clevis pin (19). The second side lug opening (26b), clevis pin (19) and second axel fault retaining protrusion (40b) may be configured such that the second primary lug radial clearance difference between the second primary lug inner radius (30b) of the second lug opening (26b) and the outer radius (32) of the clevis pin (19) is substantially equal to a primary axel radial clearance difference between the primary axel inner radius (42) of the axel opening (24) and the outer radius (32) of the clevis pin (19).

The at least one linear actuator may have a first end and a second end opposite the first end, and the first end of the at least one linear actuator may be connected to the actuator clevis (18) and the anchor clevis (21) may be connected to the platform (104), whereby the at least one linear actuator may be pivotally connected to the platform by the platform joint. The motion simulator may comprise a base joint (16) comprising: an actuator clevis, a clevis pin orientated about a first pivot axis and retained by the actuator clevis, an anchor clevis, and an axel orientated about an second pivot axis and retained by the anchor clevis; the axel comprising an axel opening orientated about the first pivot axis and configured to receive the clevis pin, the axel opening having a primary axel passage section defined by a primary axel inner radius, a first secondary axel passage section defined by a first secondary axel inner radius, and a second secondary axel passage section defined by a second secondary axel inner radius; the actuator clevis having a first side lug and a second side lug; the clevis pin extending between the first side lug and the second side lug of the actuator clevis; the axel extending between the first side lug and the second side lug of the actuator clevis; the axel comprising a first axel fault retaining protrusion having a first retaining outer radius and a first retaining inner radius; the axel comprising a second axel fault retaining protrusion having a second retaining outer radius and a second retaining inner radius; the first side lug comprising a first side lug opening orientated about the first pivot axis and configured to receive the clevis pin and the first axel fault retaining protrusion of the axel, the first side lug opening having a first primary lug passage section defined by a first primary lug inner radius and a first secondary lug passage section defined by a first secondary lug inner radius; the first side lug opening, clevis pin and first axel fault retaining protrusion configured such that a first primary lug radial clearance difference between the first primary lug inner radius of the first lug opening and an outer radius of the clevis pin is less than a first secondary lug radial clearance difference between the first secondary lug inner radius of the first lug and the first retaining outer radius of the first axel fault retaining protrusion; and the second end of the at least one linear actuator connected to the actuator clevis of the base joint and the anchor clevis of the base joint connected to the base, whereby the at least one linear actuator is pivotally connected to the base by the base joint.

The primary axel passage section (38) of the axel (22), the first secondary axel passage section (39a) of the axel (22), and the second secondary axel passage section (39b) of the axel (22) may comprise separate formed members that are fixed together. The first axel fault retaining protrusion (40a) and the first secondary axel passage section (39a) of the axel (22) may comprise a first single unitary formed member that is fixed to the primary axel passage section (38) of the axel (22), and the second axel fault retaining protrusion (40b) and the second secondary axel passage section (39b) of the axel (22) may comprise a second single unitary formed member that is fixed to the primary axel passage section (38) of the axel (22).

The primary axel passage section (38) of the axel (22), the first secondary axel passage section (39a) of the axel (22), the second secondary axel passage section (39b) of the axel (22), the first axel fault retaining protrusion (40a) of the axel (22), and the second axel fault retaining protrusion (40b) of the axel (22) may comprise a single unitary formed member. The primary axel passage section (38) of the axel (22) may comprise a first single unitary formed member, the first secondary axel passage section (39a) of the axel (22) and the first axel fault retaining protrusion (40a) of the axel may comprise a second single unitary formed member fixed to the first single unitary formed member, and the second secondary axel passage section (39b) of the axel (22) and the second axel fault retaining protrusion (40b) of the axel (20) may comprise a third single unitary formed member fixed to the first single unitary formed member.

The first primary lug passage section (28a) of the first side lug (25a) and the first secondary lug passage section (29a) of the first side lug (25a) may comprise separate formed members that are fixed together. The first primary lug passage section (28a) of the first side lug (25a) and the first secondary lug passage section (29a) of the first side lug (25a) may comprise a single unitary formed member.

The anchor clevis (21) may have a first side lug (35a) and a second side lug (35b) and the axel (22) may extend between the first side lug (35a) and the second side lug (35b) of the anchor clevis (21). The axel (22) may be configured to rotate about the first pivot axis (20) relative to the clevis pin (19) and the clevis pin (19) may be rotationally fixed relative to the to the actuator clevis (18). The clevis pin (19) may be configured to rotate about the first pivot axis (20) relative to the actuator clevis (18) and the axel (22) may be configured to rotate about the first pivot axis (20) relative to the clevis pin (19). The clevis pin (19) may configured to rotate about the first pivot axis (20) relative to the actuator clevis (18) and the axel (22) may be rotationally fixed relative to the to the clevis pin (19).

The anchor clevis (21) may have a first anchor side lug (35a) and a second anchor side lug (35b); the axel (22) may extend between the first anchor side lug and the second anchor side lug of the anchor clevis; the first anchor side lug (35a) may comprise a first side lug opening (52a) orientated about the second pivot axis (23) and configured to receive the axel, the first side lug opening may have a first primary anchor lug passage section (48a) defined by a first primary anchor lug inner radius (60a) and a first secondary anchor lug passage section (49a) defined by a first secondary anchor lug inner radius (61a); and the first anchor side lug opening (52a) and the axel (22) may be configured such that a first primary anchor lug radial clearance difference (clearance F) between the first primary anchor lug inner radius (60a) of the first anchor lug opening (52a) and a first anchor outer radius (37a) of the axel (22) is less than a first secondary anchor lug radial clearance difference (clearance G) between the first secondary anchor lug inner radius (61a) of the first anchor lug opening (52a) and the first anchor outer radius (37a) of the axel (22).

The second anchor side lug (35b) of the anchor clevis (21) may comprise a second side lug opening (52b) orientated about the second pivot axis (23) and configured to receive the axel, the second side lug opening having a second primary anchor lug passage section (48b) defined by a second primary anchor lug inner radius (60b) and a second secondary anchor lug passage section (49b) defined by a second secondary anchor lug inner radius (61b); and the second anchor side lug opening (52b) and the axel (22) may be configured such that a second primary anchor lug radial clearance difference between the second primary anchor lug inner radius (60b) of the second anchor lug opening (52b) and a second anchor outer radius (37b) of the axel (22) is less than a second secondary anchor lug radial clearance difference between the second secondary anchor lug inner radius (61b) and the second anchor outer radius (37b) of the axel (22). The first primary anchor lug inner radius (60a) of the first anchor lug opening (52a) may be substantially equal to the second primary anchor lug inner radius (60b) of the second anchor lug opening (52b), the first secondary anchor lug inner radius (61a) of the first anchor lug opening (52a) may be substantially equal to the second secondary anchor lug inner radius (61b) of the second anchor lug opening (52b), and the first anchor outer radius (37a) of the axel (22) may be substantially equal to the second anchor outer radius (37b) of the axel (22).

In another aspect, a connection joint (15, 16) is provided comprising: an actuator clevis (18), a clevis pin (19) orientated about a first pivot axis (20) and retained by the actuator clevis, an anchor clevis (21), and an axel (22) orientated about a second pivot axis (23) and retained by the anchor clevis; the axel comprising an axel opening (24) orientated about the first pivot axis and configured to receive the clevis pin, the axel opening having a primary axel passage section (38) defined by a primary axel inner radius (42), a first secondary axel passage section (39a) defined by a first secondary axel inner radius (43a, 44a), and a second secondary axel passage section (39b) defined by a second secondary axel inner radius (43b, 44b); the actuator clevis having a first side lug (25a) and a second side lug (25b); the clevis pin extending between the first side lug and the second side lug of the actuator clevis; the axel extending between the first side lug and the second side lug of the actuator clevis and configured to rotate about the first pivot axis (20) relative to the actuator clevis (18) and to rotate about the second pivot axis (23) relative to the anchor clevis (21); the axel comprising a first axel fault retaining protrusion (40a) having a first retaining outer radius (45a) and a first retaining inner radius (43a); the axel comprising a second axel fault retaining protrusion (40b) having a second retaining outer radius (45b) and a second retaining inner radius (43b); the first side lug comprising a first side lug opening (26a) orientated about the first pivot axis and configured to receive the clevis pin and the first axel fault retaining protrusion of the axel, the first side lug opening having a first primary lug passage section (28a) defined by a first primary lug inner radius (30a) and a first secondary lug passage section (29a) defined by a first secondary lug inner radius (31a); the first side lug opening (26a), clevis pin (19) and first axel fault retaining protrusion (40a) configured such that a first primary lug radial clearance difference (clearance A) between the first primary lug inner radius (30a) of the first lug opening (26a) and an outer radius (32) of the clevis pin (19) is less than a first outer secondary lug radial clearance difference (clearance E) between the first secondary lug inner radius (31a) of the first lug (25a) and the first retaining outer radius (45a) of the first axel fault retaining protrusion (40a).

The first primary anchor lug inner radius (60a) of the first anchor lug opening may be substantially equal to the second primary anchor lug inner radius (60b) of the second anchor lug opening, the first secondary anchor lug inner radius (61a) of the first anchor lug opening may be substantially equal to the second secondary anchor lug inner radius (61b) of the second anchor lug opening, and the first anchor outer radius (37a) of the axel may be substantially equal to the second anchor outer radius (37b) of the axel.

In another aspect, a connection joint (15, 16) having least two degrees of freedom is provided comprising: a first pivot axis (20) and a second pivot axis (23) intersecting the first pivot axis (20); a first clevis (18), a second clevis (21), and a center crossing axel (19, 22) between the first clevis and the second clevis; the center crossing axel configured to rotate about the first pivot axis (20) relative to the first clevis (18) and to rotate about the second pivot axis (23) relative to the second clevis (21); the first clevis (18) and the crossing axel comprising first opposed primary rotational bearing surfaces orientated about the first pivot axis (20) and defining a first primary radial clearance gap (clearance A and/or clearance B) orientated about the first pivot axis (20); the first clevis (18) and the crossing axel comprising first opposed secondary rotational bearing surfaces orientated about the first pivot axis (20) and defining a first secondary radial clearance gap (clearance E and/or clearance C) orientated about the first pivot axis (20); the first secondary radial clearance gap clearance E and/or clearance C) orientated about the first pivot axis (20) being greater than the first primary radial clearance gap (clearance A and/or clearance B) orientated about the first pivot axis (20); the second clevis (21) and the crossing axel comprising second opposed primary rotational bearing surfaces orientated about the second pivot axis (23) and defining a second primary radial clearance gap (clearance F) orientated about the second pivot axis (23); the second clevis (21) and the crossing axel comprising second opposed secondary rotational bearing surfaces orientated about the second pivot axis (23) and defining a second secondary radial clearance gap (clearance G) orientated about the second pivot axis (23); the second secondary radial clearance gap (clearance G) orientated about the second pivot axis (23) being greater than the second primary radial clearance gap (clearance F) orientated about the second pivot axis (23); wherein the crossing axel is configured to rotate about the first pivot axis (20) relative to the first clevis (18) via the first opposed secondary rotational bearing surfaces upon a fault of the first opposed primary rotational bearing surfaces; and wherein the crossing axel is configured to rotate about the second pivot axis (23) relative to the second clevis (21) via the second opposed secondary rotational bearing surfaces upon a fault of the second opposed primary rotational bearing surfaces.

The first opposed primary rotational bearing surfaces orientated about the first pivot axis (20) may comprises a clevis pin (19) retained by the first clevis (18) and having an outer primary axel bearing surface (32) orientated about the first pivot axis, and the crossing axel comprising an axel opening (24) orientated about the first pivot axis and configured to receive the clevis pin and having an inner primary pin bearing surface (42) orientated about the first pivot axis; and the first opposed secondary rotational bearing surfaces orientated about the first pivot axis may comprise the crossing axel comprising an axel fault retaining protrusion (40*a*, 40*b*) having an outer secondary clevis bearing surface (45*a*, 45*b*) orientated about the first pivot axis, and a clevis fault retaining opening (29*a*, 29*b*, 26*a*, 26*b*) in the first clevis orientated about the first pivot axis and configured to receive the axel fault retaining protrusion and having an inner secondary protrusion bearing surface (31*a*, 31*b*) orientated about the first pivot axis; wherein the first primary radial clearance gap orientated about the first pivot axis comprises an annular radial gap (clearance B) between the outer primary axel bearing surface of the clevis pin and the inner primary pin bearing surface of the axel opening of the crossing axel; and wherein the first secondary radial clearance gap orientated about the first pivot axis comprises an annular radial gap (clearance E) between the outer secondary clevis bearing surface of the axel fault retaining protrusion of the crossing axel and the inner secondary protrusion bearing surface of the clevis fault retaining opening in the first clevis.

The first opposed primary rotational bearing surfaces orientated about the first pivot axis (20) may comprise a clevis pin (19) retained by the first clevis (18) and having an outer primary clevis bearing surface (32) orientated about the first pivot axis, and a clevis pin opening (28*a*, 28*b*, 26*a*, 26*b*) in the first clevis orientated about the first pivot axis and configured to receive the clevis pin and having an inner primary pin bearing surface (30*a*, 30*b*) orientated about the first pivot axis; the first opposed secondary rotational bearing surfaces orientated about the first pivot axis may comprise the crossing axel comprising an axel fault retaining protrusion (40*a*, 40*b*) having an outer secondary clevis bearing surface (45*a*, 45*b*) orientated about the first pivot axis, and a clevis fault retaining opening (29*a*, 29*b*, 26*a*, 26*b*) in the first clevis orientated about the first pivot axis and configured to receive the axel fault retaining protrusion and having an inner secondary protrusion bearing surface (31*a*, 31*b*) orientated about the first pivot axis; wherein the first primary radial clearance gap orientated about the first pivot axis comprises an annular radial gap (clearance A) between the outer primary clevis bearing surface of the clevis pin and the inner primary pin bearing surface of the clevis pin opening in the first clevis; and wherein the first secondary radial clearance gap orientated about the first pivot axis comprises an annular radial gap (clearance E) between the outer secondary clevis bearing surface of the axel fault retaining protrusion of the crossing axel and the inner secondary protrusion bearing surface of the clevis fault retaining opening in the first clevis.

The second opposed primary rotational bearing surfaces orientated about the second pivot axis (23) may comprise the crossing axel having a shaft portion (36*a*, 36*b*) retained by the second clevis (21) and having an outer primary bearing surface (37*a*, 37*b*) orientated about the second pivot axis, and a primary shaft opening (48*a*, 48*b*, 52*a*, 52*b*) in the second clevis orientated about the second pivot axis and configured to receive the outer primary bearing surface of the shaft portion of the crossing axel and having an inner primary bearing surface (60*a*, 60*b*) orientated about the second pivot axis; the second opposed secondary rotational bearing surfaces orientated about the second pivot axis may comprise the shaft portion of the crossing axel having an outer secondary bearing surface (37*a*, 37*b*) orientated about the second pivot axis, and a secondary shaft opening (49*a*, 49*b*, 52*a*, 52*b*) in the second clevis orientated about the second pivot axis and configured to receive the outer secondary bearing surface of the shaft portion of the crossing axel and having an inner secondary bearing surface (61*a*, 61*b*) orientated about the second pivot axis; wherein the second primary radial clearance gap orientated about the second pivot axis comprises an annular radial gap (clearance F) between the outer primary bearing surface of the shaft portion of the crossing axel and the inner primary bearing surface of the primary shaft opening in the second clevis; and wherein the second secondary radial clearance gap orientated about the second pivot axis comprises an annular radial gap (clearance G) between the outer secondary bearing surface of the shaft portion of the crossing axel and the inner secondary bearing surface of the secondary shaft opening in the second clevis.

The first opposed primary rotational bearing surfaces orientated about the first pivot axis (20) may further comprise the clevis pin having an outer clevis bearing surface (32) orientated about the first pivot axis, and a clevis pin opening in the first clevis orientated about the first pivot axis and configured to receive the outer clevis bearing surface of the clevis pin and having an inner pin bearing surface (30*a*, 30*b*) orientated about the first pivot axis; wherein a pin-to-clevis radial clearance gap orientated about the first pivot axis is provided comprising an annular radial gap (clearance A) between the outer clevis bearing surface of the clevis pin and the inner pin bearing surface of the clevis pin opening in the first clevis; and the first secondary radial clearance gap (clearance E) orientated about the first pivot axis is greater than the pin-to-clevis radial clearance gap orientated about the first pivot axis (clearance A).

The first opposed secondary rotational bearing surfaces orientated about the first pivot axis (20) may further comprise the axel fault retaining protrusion having an inner secondary bearing surface (43*a*, 43*b*) orientated about the first pivot axis, and the clevis pin having an outer fault retaining surface (32) orientated about the first pivot axis; wherein a pin-to-axel-protrusion radial clearance gap (clearance C) orientated about the first pivot axis is provided comprising an annular radial gap (clearance C) between the inner secondary bearing surface of the axel fault retaining protrusion of the crossing axel and the outer fault retaining surface of the clevis pin; and the pin-to-axel-protrusion radial clearance gap (clearance C) orientated about the first pivot axis is greater than the first primary radial clearance gap (clearance B) orientated about the first pivot axis.

The first opposed secondary rotational bearing surfaces orientated about the first pivot axis (20) may further comprise the axel fault retaining protrusion having an inner secondary bearing surface (43a, 43b) orientated about the first pivot axis, and the clevis pin having an outer fault retaining surface (32) orientated about the first pivot axis; wherein a pin-to-axel-protrusion radial clearance gap (clearance C) orientated about the first pivot axis is provided comprising an annular radial gap (clearance C) between the inner secondary bearing surface of the axel fault retaining protrusion of the crossing axel and the outer fault retaining surface of the clevis pin; and the pin-to-axel-protrusion radial clearance gap (clearance C) orientated about the first pivot axis may be greater than the first primary radial clearance gap (clearance A) orientated about the first pivot axis.

The first opposed secondary rotational bearing surface orientated about the first pivot axis (20) may further comprise the axel opening (24) of the crossing axel having an inner secondary pin bearing surface (44a, 44b) orientated about the first pivot axis; and the clevis pin having an outer secondary bearing surface (32) orientated about the first pivot axis; wherein a secondary axel-to-pin radial clearance gap (clearance D) orientated about the first pivot axis is provided comprising an annular radial gap (clearance D) between the inner secondary pin bearing surface of the axel opening of the crossing axel and the outer secondary bearing surface of the clevis pin; and the secondary axel-to-pin radial clearance gap (clearance D) orientated about the first pivot axis is greater than the first primary radial clearance gap (clearance B) orientated about the first pivot axis.

The first opposed secondary rotational bearing surface orientated about the first pivot axis (20) may further comprise the axel opening (24) of the crossing axel having an inner secondary pin bearing surface (44a, 44b) orientated about the first pivot axis; and the clevis pin having an outer secondary bearing surface (32) orientated about the first pivot axis; wherein a secondary axel-to-pin radial clearance gap (clearance D) orientated about the first pivot axis is provided comprising an annular radial gap (clearance D) between the inner secondary pin bearing surface of the axel opening of the crossing axel and the outer secondary bearing surface of the clevis pin; and the secondary axel-to-pin radial clearance gap (clearance D) orientated about the first pivot axis is greater than the first primary radial clearance gap (clearance A) orientated about the first pivot axis.

The annular radial gap between the outer primary axel bearing surface (32) of the clevis pin and the inner primary pin bearing surface (42) of the axel opening of the crossing axel (clearance B) may be substantially equal to the pin-to-clevis radial clearance gap (clearance A) orientated about the first pivot axis comprising the annular radial gap (clearance A) between the outer clevis bearing surface (32) of the clevis pin and the inner pin bearing surface (30a, 30b) of the clevis pin opening in the first clevis.

The first clevis (18) and the clevis pin (19) may comprise a single unitary formed member. The crossing axel (22) and the clevis pin (19) may comprise a single unitary formed member. The crossing axel (22) may be configured to rotate about the first pivot axis (20) relative to the clevis pin (19) and the clevis pin (19) may be rotationally fixed relative to the first clevis (18). The clevis pin (19) may be configured to rotate about the first pivot axis (20) relative to the first clevis (18) and the crossing axel (22) may be configured to rotate about the first pivot axis (20) relative to the clevis pin (19). The clevis pin (19) may be configured to rotate about the first pivot axis (20) relative to the first clevis (18) and the crossing axel (22) may be rotationally fixed relative to the clevis pin (19).

The second clevis (21) may comprise a first side lug (35a) and a second side lug (35b) and the shaft portion (36a, 36b) of the crossing axel may extend between the first side lug and the second side lug of the second clevis; the first side lug may comprise a first side lug opening (52a) orientated about the second pivot axis (23) and configured to receive the shaft portion (36a) of the crossing axel, the first side lug opening having a first primary shaft passage section (48a) defined by a first primary shaft inner radius (60a) and a first secondary shaft lug passage section (49a) defined by a first secondary shaft inner radius (61a); and the second side lug may comprise a second side lug opening (52b) orientated about the second pivot axis (23) and configured to receive the shaft portion (36b) of the crossing axel, the second side lug opening having a second primary shaft passage section (48b) defined by a second primary shaft inner radius (60b) and a second secondary shaft lug passage section (49b) defined by a second secondary shaft inner radius (61b). The connection joint may comprise a base (102); a platform (104); a plurality of linear actuators (108a, 108b, 108c, 108d, 108e, 108f) through which the platform is connected to the base; the plurality of linear actuators controllable to move the platform relative to the base in at least two degrees of freedom; and at least one of the plurality of linear actuators connected to the platform and/or the base by the connection joint (15, 16).

DETAILED DESCRIPTION OF THE EMBODIMENTS

Figure 1:
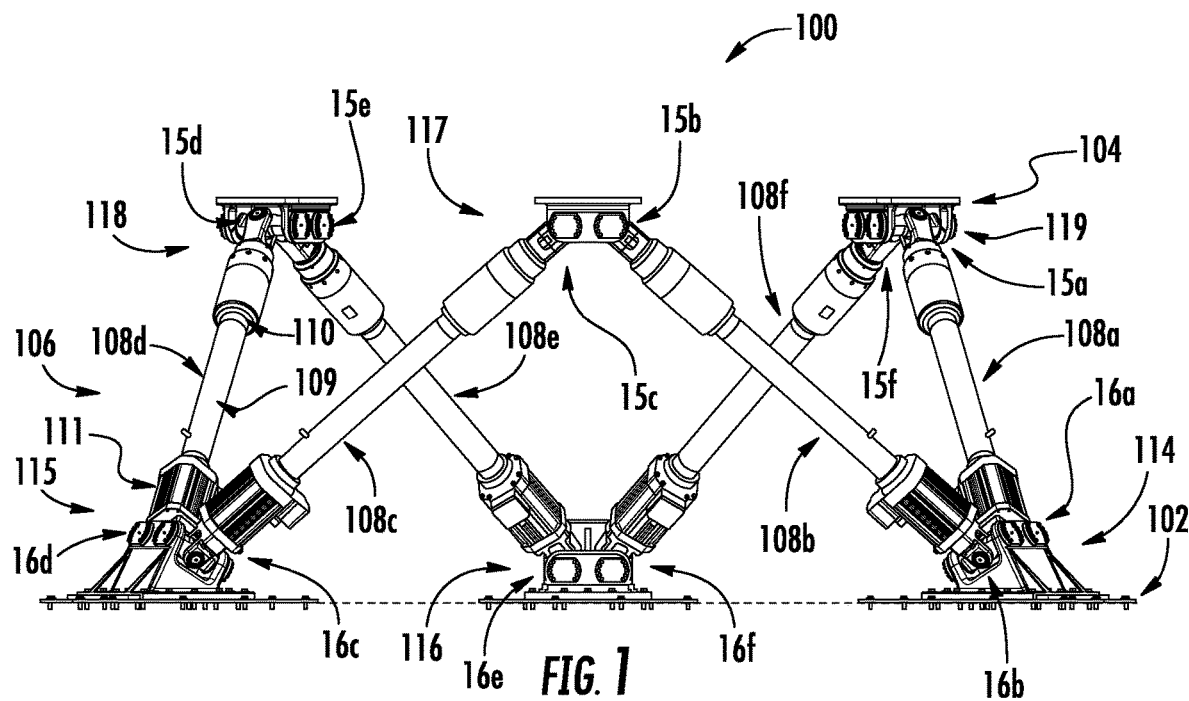
FIG. 1 is perspective view of a first embodiment of an improved motion simulator.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
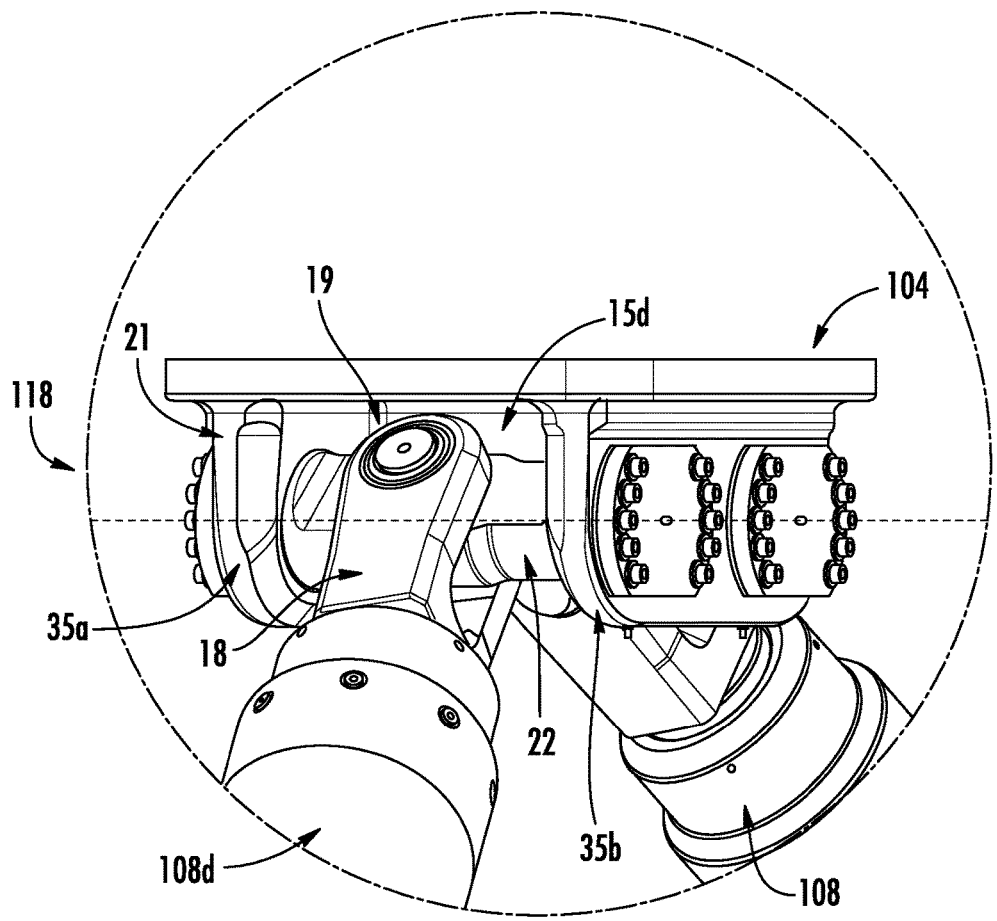
FIG. 2 is an enlarged perspective view of an actuator platform joint of the motion simulator shown in FIG. 1.
Figure 3:
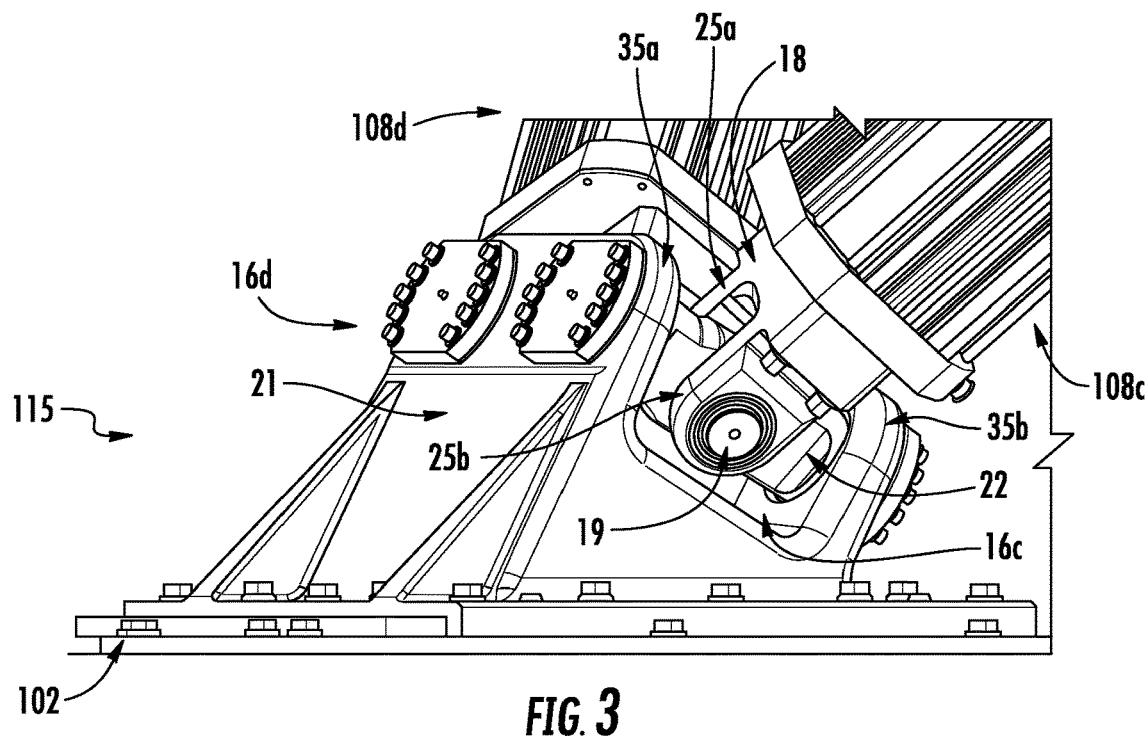
FIG. 3 is an enlarged perspective view of an actuator base joint of the motion simulator shown in FIG. 1.
Figure 4:
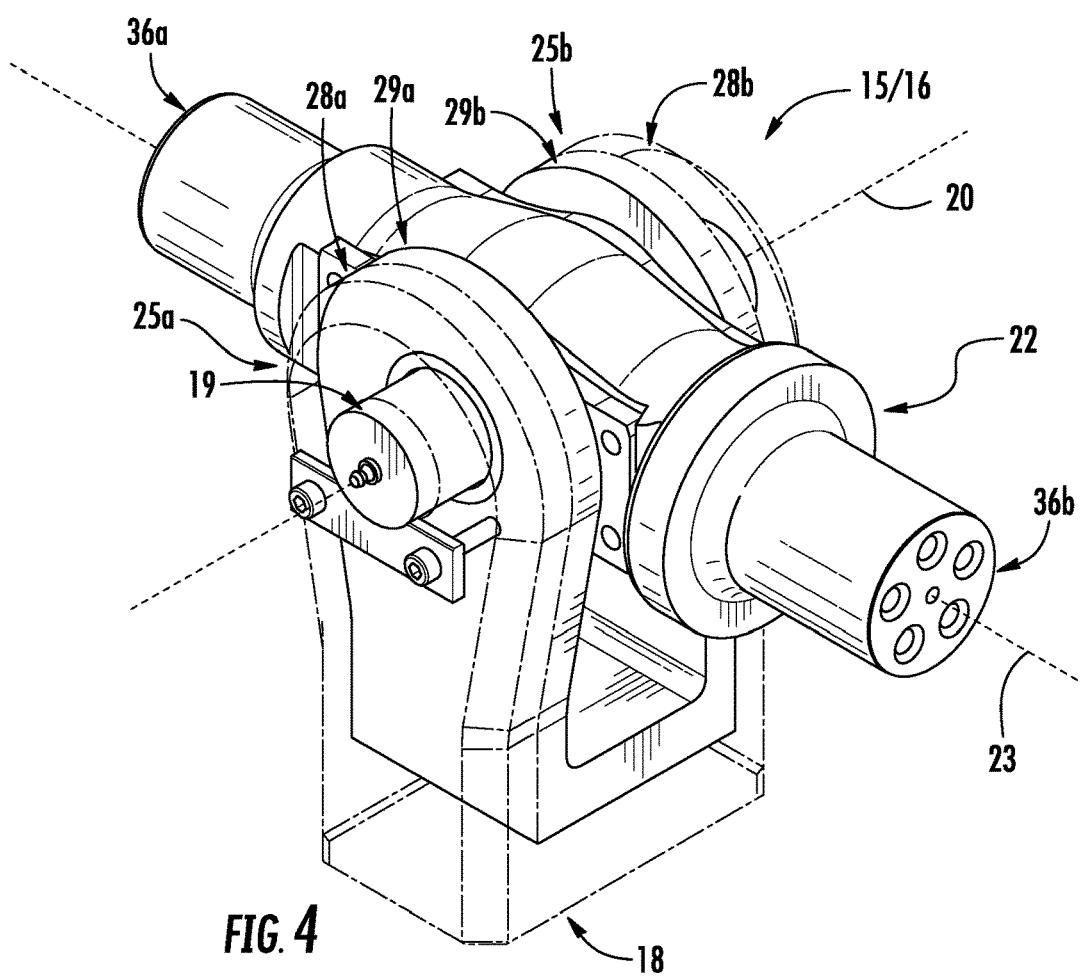
FIG. 4 is a partial perspective view of the joints shown in FIGS. 2 and 3.
Figure 5:
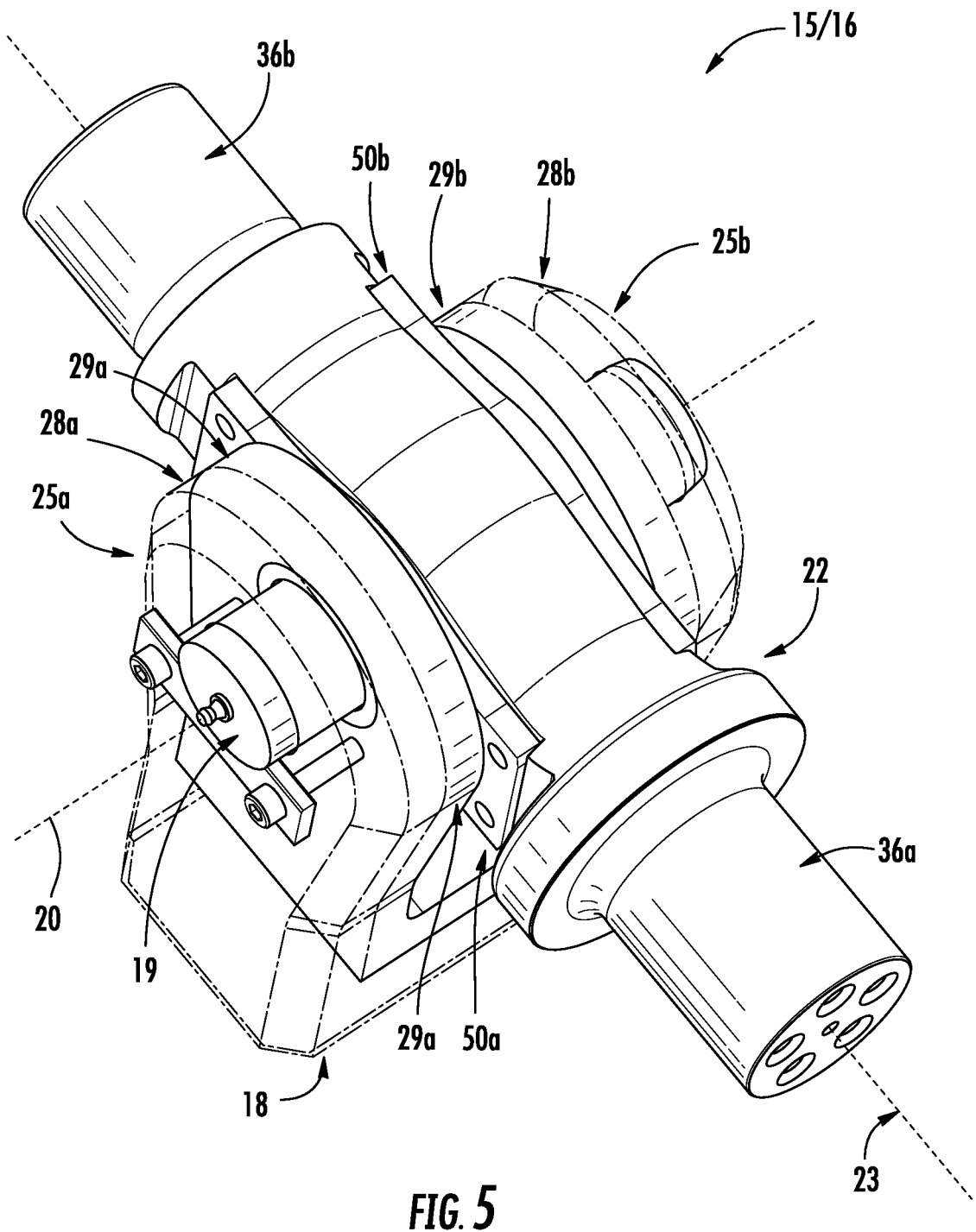
FIG. 5 is a top partial perspective view of the joint shown in FIG. 4.

Referring now to the drawings, and more particularly to FIGS. 1-3 thereof, an improved motion simulator is provided, a first embodiment of which is generally indicated at 100. As shown, system 100 generally includes fixed base 102 and load bearing platform 104. Load bearing platform 104 is joined to base 102 and driven relative to base 102 by hexapod 106.

Base 102 is generally triangular in shape and has first, second and third vertexes 114, 115 and 116, respectively, as shown in FIG. 1. Base 102 is attached to a solid immoveable surface such as the floor of a building, outdoor facility, entertainment complex or the like. As shown, actuator vertexes 114, 115 and 116 are orientated equal distances about base 102. Platform 104 comprises a plate member which has a generally flat support surface. Platform has first, second and third vertexes 117, 118 and 119, respectively, as shown in FIG. 1. Platform 104 provides a load bearing support structure for a simulated carriage, cockpit, game, ride or the like.

Hexapod 106 comprises six linear actuators 108a, 108b, 108c, 108d, 108e and 108f connected to base 102 via universal joints 16a, 16b, 16c, 16d, 16e and 16f, respectively, and connected to platform 104 via universal joints 15a, 15b, 15c, 15d, 15e and 15f, respectively. Each of the linear actuators 108a, 108b, 108c, 108d, 108e and 108f are substantially identical and, as such, only actuator 108d will be described here, with reference to FIGS. 1-3. Linear actuator 108d comprises first universal connection joint 15d with platform 104 and second universal connection joint 16d with base 102. Universal joints 15d and 16d are at opposite ends of actuator 108d. Cylinder 109 is provided between joints 16d and 15d, which houses piston 110. Piston 110 is mounted inside cylinder 109 with a ball screw which is actuated via electric motor 111 proximate first universal joint 16d. Motor 111 is connected to the ball screw such that piston 110 can be driven in and out of cylinder 109 by motor 111. Thus, in this embodiment, linear actuators 108a, 108b, 108c, 108d, 108e and 108f are electromechanical actuators that include an electric motor having a rotatable output shaft, an outer tube or cylinder surrounding a ball screw connected to the output shaft, an extendable inner piston containing an internal nut engaged with the ball screw such that turning of the screw by the motor extends or retracts the piston which acts as the outer extendable end of the actuator. While electromechanical linear actuators are described in this embodiment, alternative types of linear actuators may be used.

Linear actuators 108a, 108b, 108c, 108d, 108e and 108f include a position feedback transducer or encoder that determines the position of inner piston 110 with respect to outer cylinder 109. Actuators 108a, 108b, 108c, 108d, 108e and 108f include controllers that command and drive motor 111 of the respective actuator. System control software may also continuously monitor actuator performance and an abnormality may be measured and a fault warning signal may be generated.

Accordingly, as shown, six linear actuators 108a, 108b, 108c, 108d, 108e and 108f have upper ends interconnected with load bearing structure 104 by three pairs of two-degree-of-freedom joints 15a, 15b, 15c, 15d, 15e and 15f, respectively. The lower end of actuators 108a, 108b, 108c, 108d, 108e and 108f are interconnected with fixed base 102 by three pairs of two-degree-of-freedom joints 16a, 16b, 16c, 16d, 16e and 16f, respectively.

Each of the universal joints 15a, 15b, 15c, 15d, 15e, 15f, 16a, 16b, 16c, 16d, 16e and 16f are substantially identical and, as such, they will each be described with reference to FIGS. 4-24. As shown in FIGS. 2-5, joint connection 15 and 16 each include actuator clevis 18, clevis pin 19 retained by actuator clevis 18, anchor clevis 21, and axel 22 retained by anchor clevis 21. Axel 22 is configured to rotate about second pivot axis 23 relative to anchor clevis 21. Axel 22 is also configured to rotate on clevis pin 19 about first pivot axis 20 relative to clevis pin 19. First and second pivot axes 20 and 23 are oriented 90° with respect to each other. Thus, actuator 108 has clevis-type end 18 with clevis type pin 19 oriented about pivot axis 20. Axel 20 comprise a corresponding opening 24 orientated about pivot axis 23 that is configured to receive clevis pin 19, such that actuator 108 is pivotally connected to axel 22 by the pin joint connection.

Axel 22 is in turn pivotally connected to anchor 21 of platform 104 or base 102. As shown, platform 104 and base 102 each include clevis-type anchor 21 with clevis type pin or axel 22 oriented about pivot axis 23, such that base 102 or platform 104 is pivotally connected to axel 22 by the pin joint connection.

Clevis pin 19 is a solid cylindrical member orientated about axis 20 and having an outside radius 32. In this embodiment, outside radius 32 is constant along the length of clevis pin 19. In this embodiment, clevis pin 19 is rotationally fixed by an anti-rotation plate in actuator clevis 18 and does not rotate about first pivot axis 20 relative to clevis 18. Alternatively, however, clevis pin 19 may be rotationally supported by clevis 18 and configured to rotate about first pivot axis 20 relative to actuator clevis 18.

Actuator clevis 18 comprises first and second side lugs 25a and 25b with openings 26a and 26b therein, respectively. Openings 26a and 26b are orientated about axis 20 and support the ends of pin 19. Clevis 18 comprises primary portion 28, shown in FIGS. 6, 13 and 20, and secondary portion 29, shown in FIGS. 7, 17 and 21. Thus, opening 26a in side lug 25a has primary lug section 28a and secondary lug section 29a. Similarly, opening 26b in side lug 25b has primary lug section 28b and secondary lug section 29b. The inner radius 30a of opening 26a in primary lug section 28a of side lug 25a is less than the inner radius 31a of opening 26a of side lug 25a in secondary lug section 29a. Similarly, the inner radius 30b of opening 26b in primary lug section 28b of side lug 25b is less than the inner radius 31b of opening 26b of side lug 25b in secondary lug section 29b. In this embodiment, inner radius 30a and inner radius 30b are the same and inner radius 31a and inner radius 31b are the same.

Figure 24:
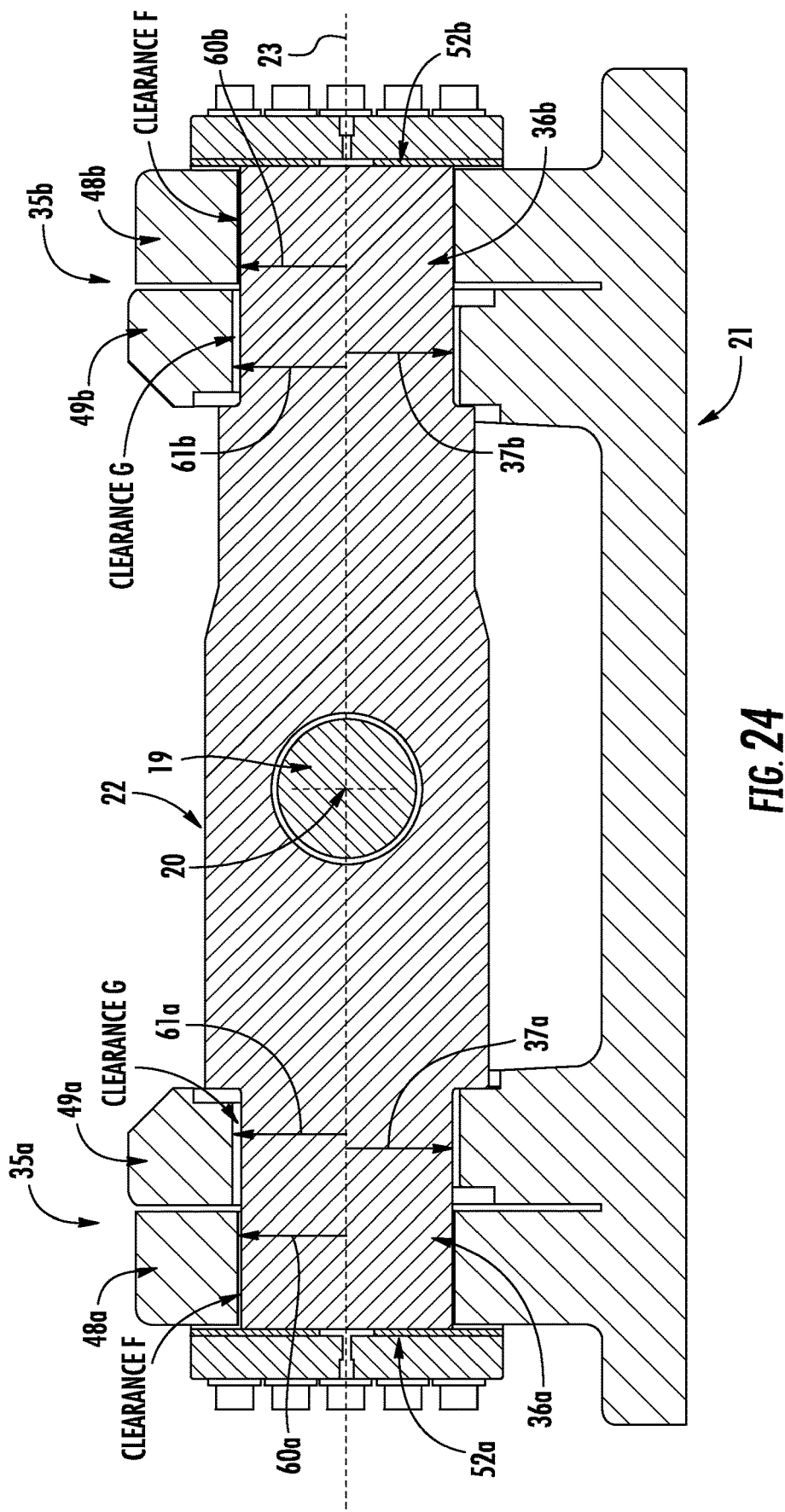
FIG. 24 is a longitudinal vertical cross-sectional view of the anchor clevis shown in FIG. 2.

As shown in FIG. 24, anchor clevis 21 comprises first and second side lugs 35a and 35b with openings 52a, and 52b therein, respectively. Such openings are orientated about axis 23 and rotationally support the opposed ends 36a and 36b of axel 22. Side lug 35a includes primary lug section 48a with opening 52a extending therein and secondary lug section 49a with opening 52a extending therethrough. Similarly, side lug 35b includes primary lug section 48b with opening 52b extending therein, and secondary lug section 49b with opening 52b extending therethrough. End 36a of axel 22 extends through opening 52a in both lug sections 48a and 49a. End 36b of axel 22 extends through opening 52b in both lug sections 48b and 49b. Providing side-by-side dual lug sections 48a, 49a and 48b, 49b provides fault tolerant redundancy to anchor clevis 21. As described with respect to actuator clevis 18, the inner radius 60a of opening 52a in primary lug section 48a of anchor lug 35a is less than the inner radius 61a of opening 52a in secondary lug section 49a of anchor lug 35a. Similarly, the inner radius 60b of opening 52b in primary lug section 48b of anchor lug 35b is less than the inner radius 61b of opening 52b in secondary lug section 49b of anchor lug 35b.

In this embodiment, clevis pin 19 is rotationally fixed in primary lug sections 28a and 28b of side lugs 25a and 25b by an anti-rotation plate in actuator clevis 18 and does not rotate about first pivot axis 20 relative to clevis 18. Instead, axel 22 is configured to rotate on clevis pin 19 about axis 20, such that axel 22 is free to rotate about both axis 20 and axis 23, thereby allowing second pivot axis 23 to rotate about axis 20. Alternatively, however, clevis pin 19 may be rotationally supported by primary lug sections 28a and 28b of side lugs 25a and 25b so as to rotate about first pivot axis 20 relative to actuator clevis 18.

Figure 6:
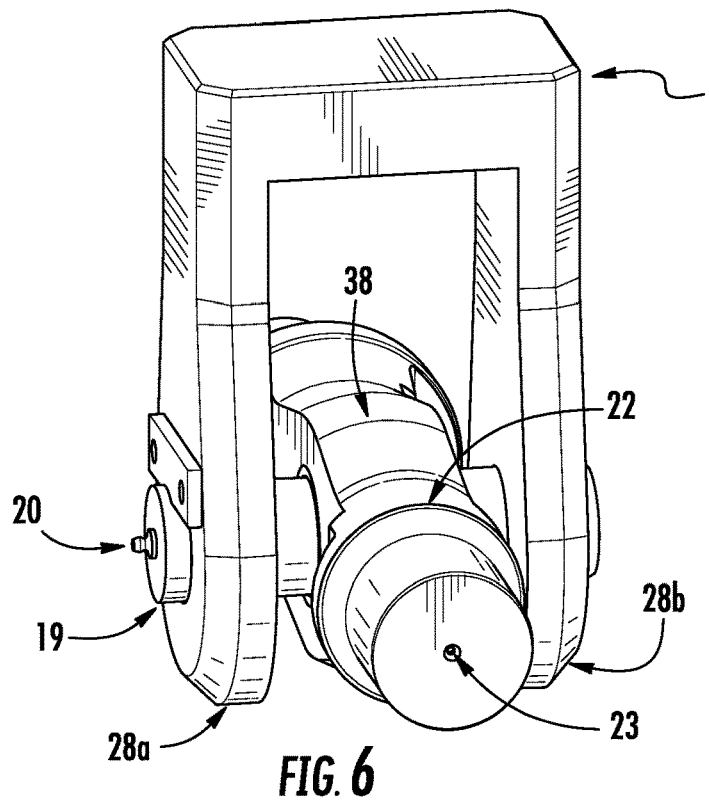
FIG. 6 is a partial perspective view of the primary load path elements of the joint shown in FIG. 5.
Figure 7:
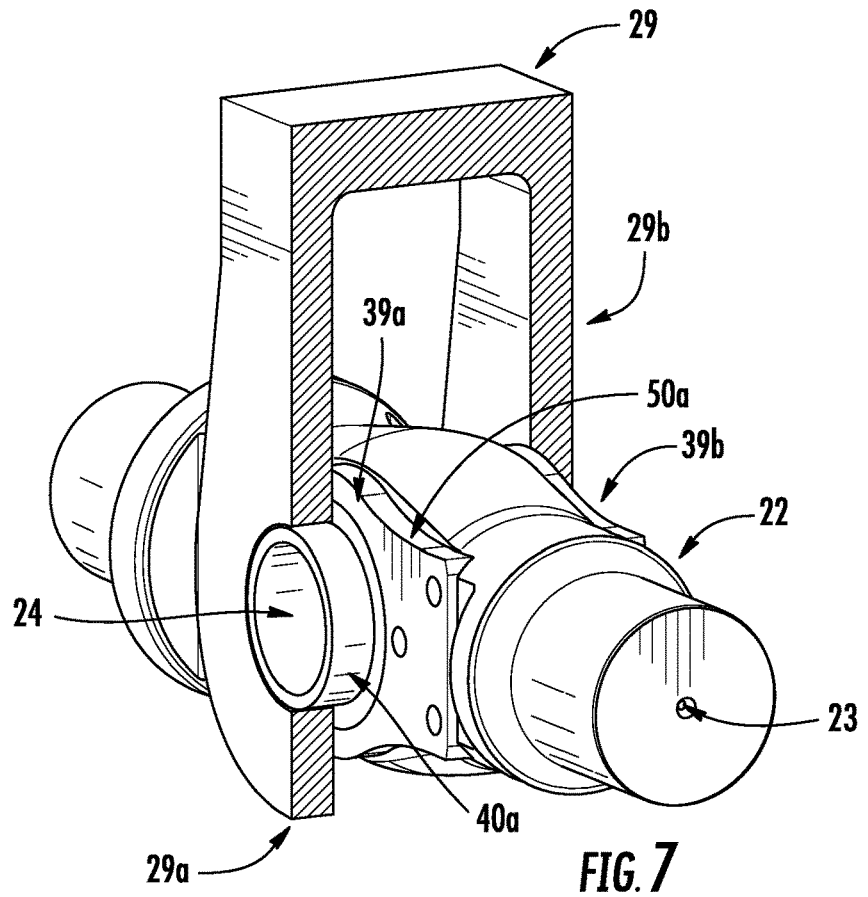
FIG. 7 is a partial perspective and cutaway view of the standby load path elements of the joint shown in FIG. 5.
Figure 8:
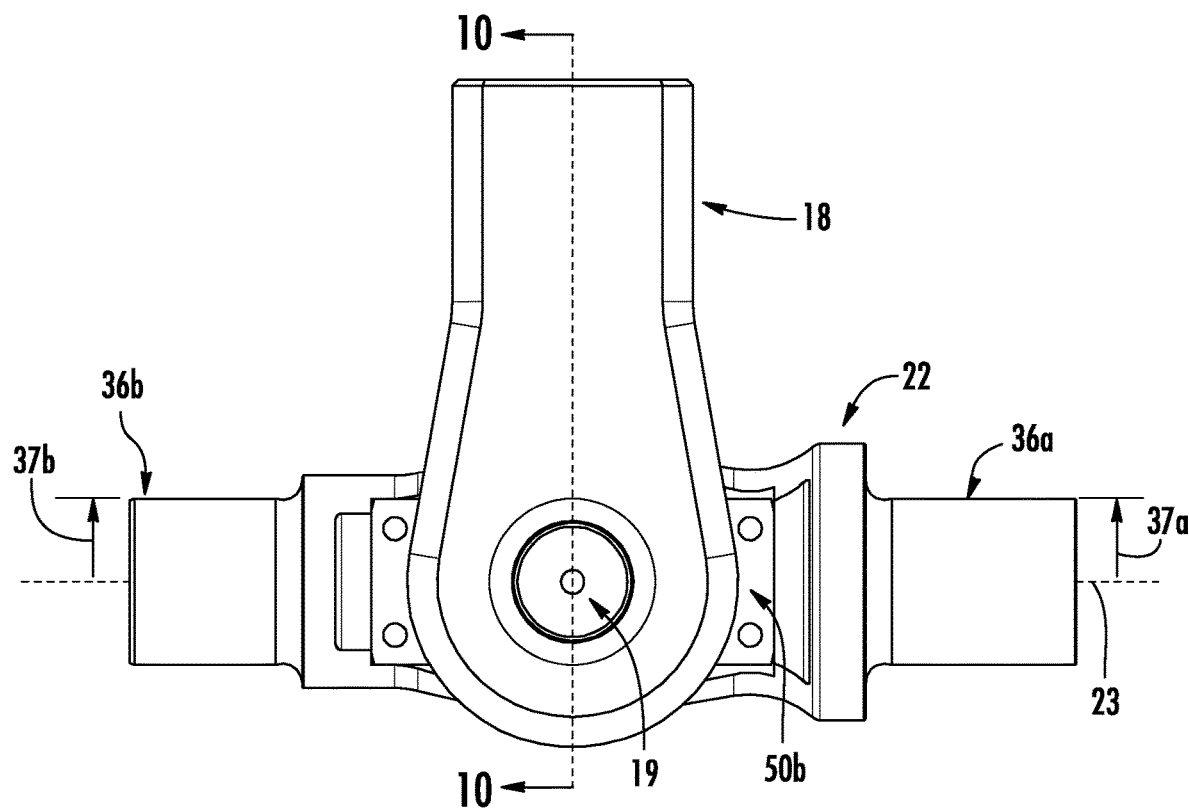
FIG. 8 is a right side view of the joint shown in FIG. 5.
Figure 9:
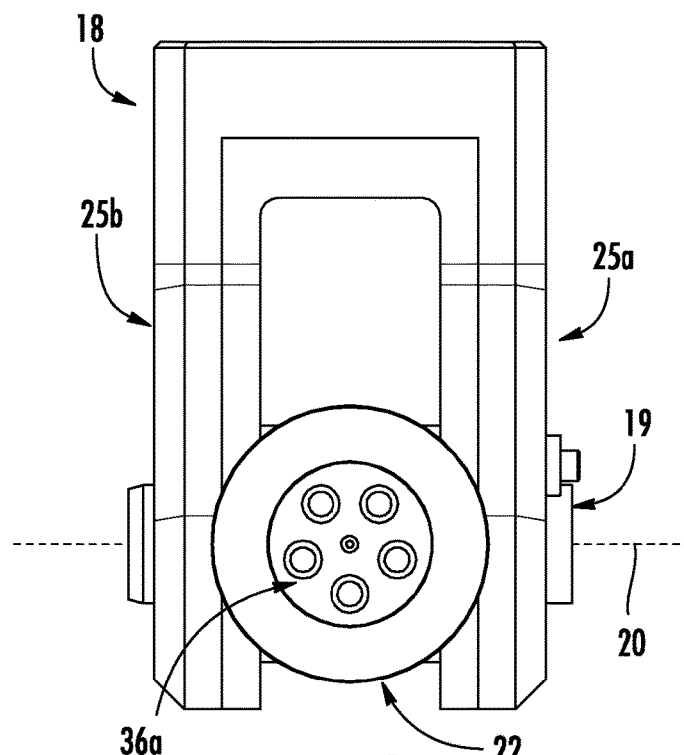
FIG. 9 is a right side view of the joint shown in FIG. 8.
Figure 10:
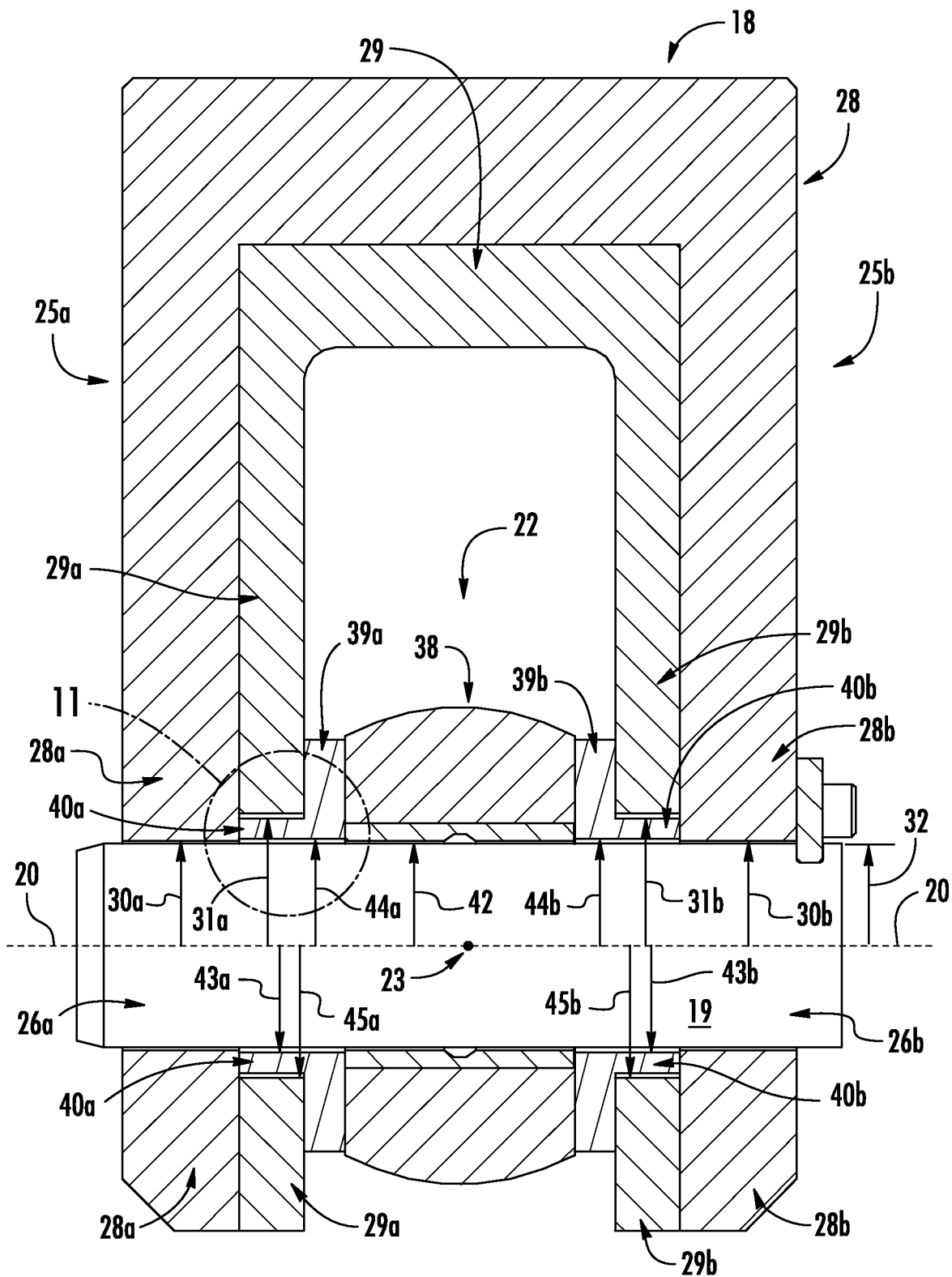
FIG. 10 is a longitudinal vertical cross-sectional view of the joint shown in FIG. 8, taken generally on line A-A of FIG. 8.
Figure 13:
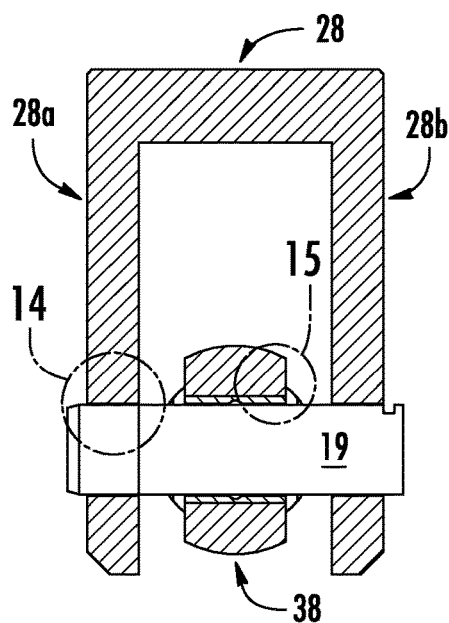
FIG. 13 is a longitudinal vertical cross-sectional view of the joint shown in FIG. 12, taken generally on line B-B of FIG. 12.
Figure 17:
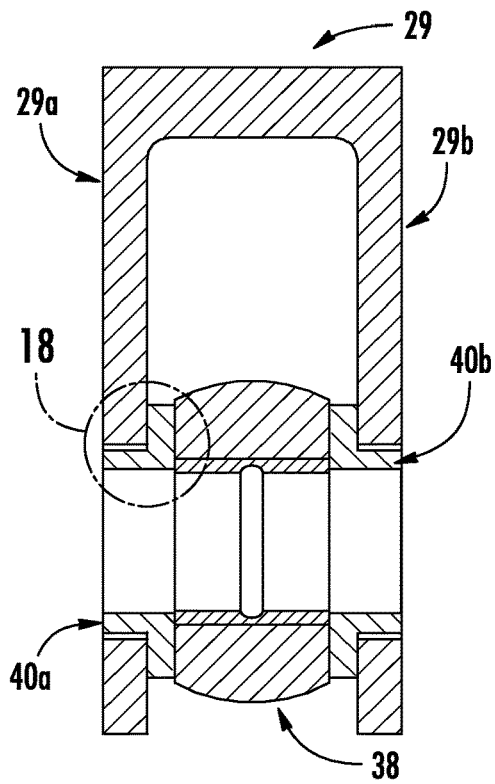
FIG. 17 is a longitudinal vertical cross-sectional view of the joint shown in FIG. 16, taken generally on line C-C of FIG. 16.
Figure 22:
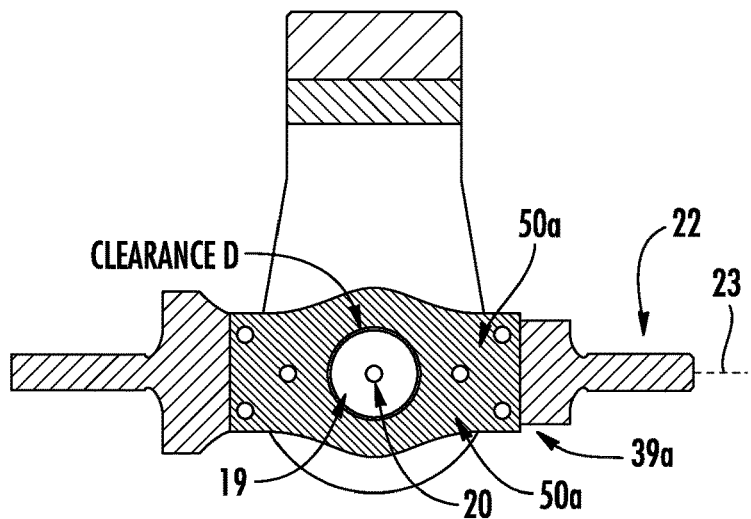
FIG. 22 is a third transverse vertical cross-sectional view of the joint shown in FIG. 19, taken generally on line F-F of FIG. 19.
Figure 23:
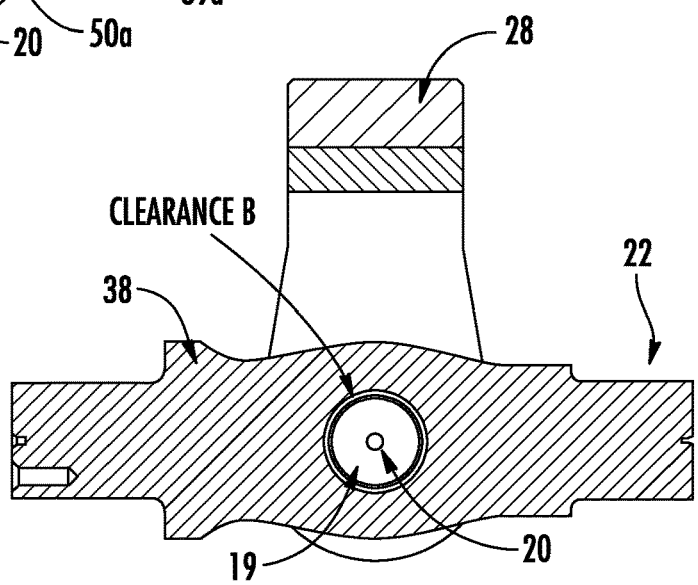
FIG. 23 is a fourth transverse vertical cross-sectional view of the joint shown in FIG. 19, taken generally on line G-G of FIG. 19.

Axel 22 comprises primary portion 38, shown in FIGS. 6, 13 and 23, and secondary side portions 39a and 39b, shown in FIGS. 7, 17 and 22. Thus, opening 24 in axel 22 has primary axel section 38 and secondary axel sections 39a and 39b. Secondary axel section 39a comprises annular projection 40a that is received and rotates in section 29a of opening 26a of clevis 18 and has inner radius 43a and outer radius 45a. Secondary axel section 39a also includes a portion that does not extend into opening 26a of clevis 18 and that has inner radius 44a. In this embodiment, inner radius 43a and inner radius 44a are the same. Similarly, secondary axel section 39b comprises annular projection 40b that is received and rotates in section 29b of opening 26b of clevis 18 and has inner radius 43b and outer radius 45b. Secondary axel section 39b also includes a portion that does not extend into opening 26b of clevis 18 and that has inner radius 44b. In this embodiment, inner radius 43b and inner radius 44b are the same.

In this embodiment, as shown in FIGS. 7 and 22, secondary side portion 39a is formed in part by side plate 50a that is bolted to the main body of axel 22 and includes an opening and a cylindrical insert that fits in the opening of plate 50a and includes annular projection 40a. Similarly, secondary side portion 39b is formed in part by side plate 50b that is bolted to the main body of axel 22 and includes an opening and a cylindrical insert that fits in the opening of plate 50b and includes annular projection 40b. The inner radius 42 of opening 24 in primary lug section 38 of axel 22 is less than the radius 43a and 44a of opening 24 of axel 22 in secondary axel section 39a. Similarly, the radius 42 of opening 24 in primary axel section 38 of axel 22 is less than the radius 43b and 44b of opening 24 of axel 22 in secondary lug section 39b. In this embodiment, radius 43a, 44a, 43b and 44b are the same.

Thus, in this embodiment, primary axel section 38 of axel 22, secondary axel section 39a of axel 22, and secondary axel section 39b of axel 22 comprise separate formed members that are fixed together. Furthermore, annular protrusions 40a and 40b comprise separate formed members that are fixed to the other separately formed members of secondary axel section 39a and secondary axel section 39b of axel 22, respectively. However, alternatively and without limitation, the primary axel section 38 of the axel 22, the secondary axel sections 39a and 39b of the axel 22, including the retaining protrusions 40a and 40b of the axel 22 may comprise a single unitary formed member. Other combinations may be employed. For example, primary axel section 38 of axel 22 may comprise a first single unitary formed member, secondary axel section 39a of axel 22 and axel fault retaining protrusion 40a of axel 22 may comprise a second single unitary formed member fixed to the first single unitary formed member, and secondary axel passage section 39b of axel 22 and axel retaining protrusion 40b of axel 22 may comprise a third single unitary formed member fixed to the first single unitary formed member. As another alternative, axel 22 and clevis pin 19 may comprise a single unitary formed member, in which case clearance B described below between inner radius 42 of opening 24 in primary axel section 38 of axel 22 and the outer radius 32 of clevis pin 19 would be zero. In the embodiment in which axel 22 and clevis pin 19 comprise a single unitary formed member and clearance B described below is zero, clevis pin 19 is not be rotationally fixed in primary lug sections 28a and 28b of side lugs 25a and 25b and is rotationally supported by clevis 18 and configured to rotate about first pivot axis 20 relative to actuator clevis 18. Thus, such elements may be separate pieces fixed to each other, may be a single unitary formed member, or may be a combination.

In a similar manner, primary lug sections 28a and 28b of side lugs 25a and 25b, respectively, may comprise a first single unitary formed member and secondary lug sections 29a and 29b of side lugs 25a and 25b, respectively, may comprise a second single unitary formed member, and such first and second single unitary formed members may comprise separate formed members that are fixed together. Alternatively, and without limitation, primary lug sections 28a and 28b of side lugs 25a and 25b, respectively, and secondary lug sections 29a and 29b of side lugs 25a and 25b, respectively, may comprise a single unitary formed member. As another alternative, lug passage section 28a and clevis pin 19 may comprise a single unitary formed member, in which case clearance A described below between inner radius 30a of opening 26a in primary lug section 28a of side lug 25a and the outer radius 32 of clevis pin 19 would be zero. In the embodiment in which lug passage section 28a and clevis pin 19 comprise a single unitary formed member and clearance A described below is zero, anchor 22 is not rotationally fixed to clevis pin 19 and is configured to rotate about first pivot axis 20 relative to clevis pin 19. Thus, such elements may be separate pieces fixed to each other, may be a single unitary formed member, or may be a combination.

Figure 14:
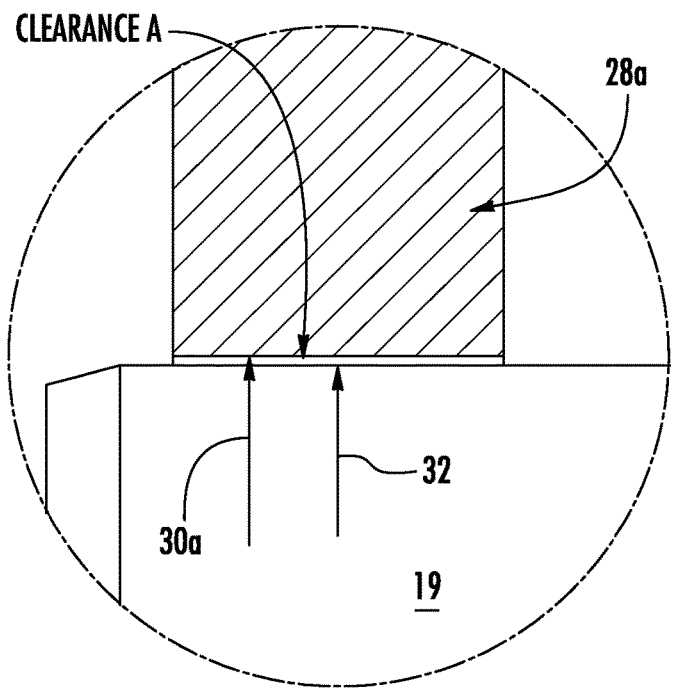
FIG. 14 is an enlarged cross-sectional view of the joint shown in FIG. 13, taken generally within the indicated circle of FIG. 13.
Figure 20:
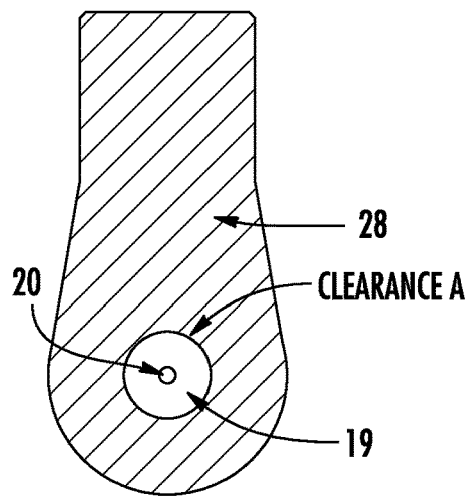
FIG. 20 is a first transverse vertical cross-sectional view of the joint shown in FIG. 19, taken generally on line D-D of FIG. 19.

As shown in FIGS. 14 and 20, a small bearing clearance A is provided between the inner radius 30a of opening 26a in primary lug section 28a of side lug 25a and the outer radius 32 of clevis pin 19. This same clearance A is provided on the other side between the inner radius 30b of opening 26b in primary lug section 28b of side lug 25b and the outer radius 32 of clevis pin 19. For example and without limitation, clearance A may be 1/1000 of an inch. A linear force may be transferred between actuator clevis 18 and clevis pin 19 in a primary load path.

Figure 15:
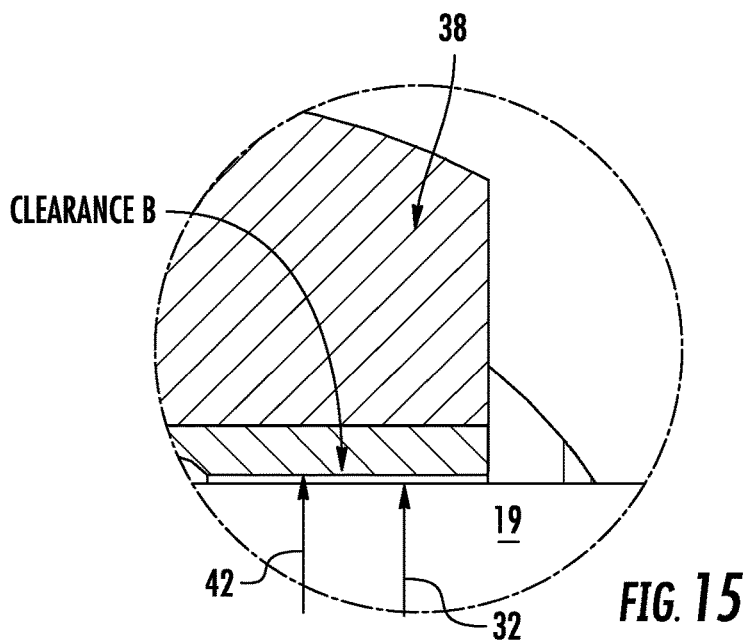
FIG. 15 is an enlarged cross-sectional view of the joint shown in FIG. 13, taken generally within the indicated circle of FIG. 13.
Figure 16:
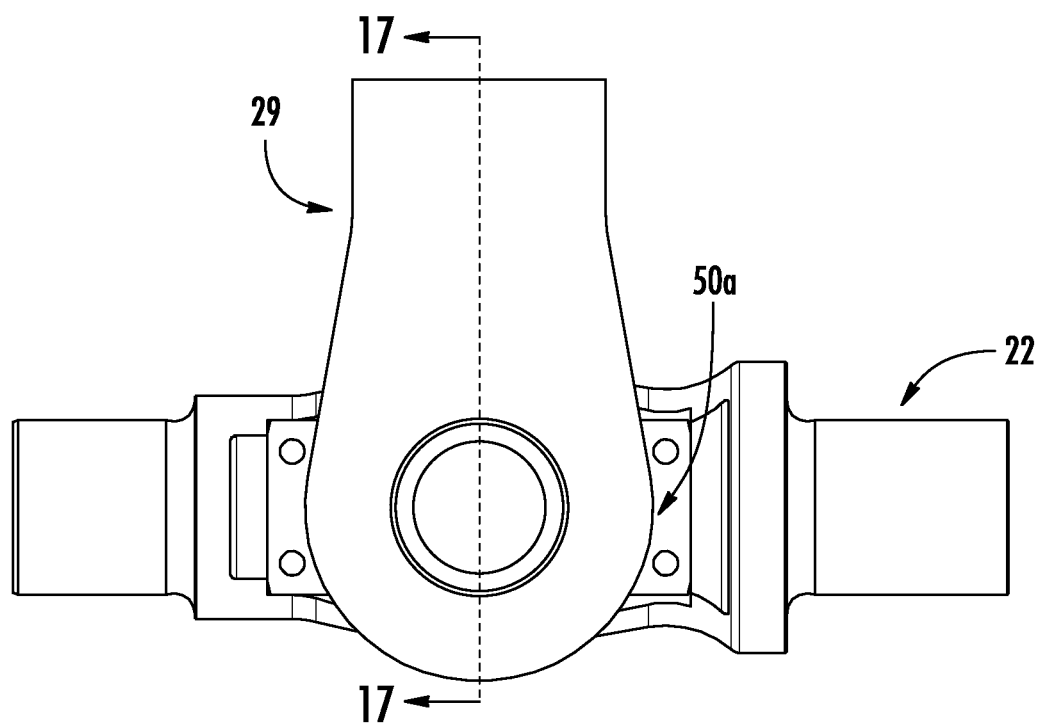
FIG. 16 is a left side view of the joint elements shown in FIG. 7.

As shown in FIGS. 15 and 23, a small bearing clearance B is provided between the inner radius 42 of opening 24 in primary axel section 38 of axel 22 and the outer radius 32 of clevis pin 19. In this embodiment, clearance B is the same as clearance A. For example and without limitation, clearance B may be 1/1000 of an inch. Clearance B allows for axel 22 to rotate on clevis pin 19 relative to actuator clevis 18 while transferring a linear force between clevis pin 19 and axel 22 in the primary load path.

As shown in FIG. 24, similarly to clearance A, a small bearing clearance F is provided between the inner radius 60a and 60b of opening 52a in primary lug sections 48a and 48b of anchor lugs 35a and 35b of anchor clevis 21 and the outer radius 37a and 37b of opposed ends 36a and 36b, respectively, of axel 22. For example and without limitation, such clearance F may be 1/1000 of an inch. This anchor clearance F allows for axel 22 to rotate about axis 23 in primary lug sections 48a and 48b of anchor clevis 21 while transferring a linear force between axel 22 and anchor clevis 21 in the primary load path, thereby completing the primary load path between actuator clevis 18 and anchor clevis 21, and thereby between actuator 108 and platform 104 or base 102 as the case may be.

Thus, a primary load path is provided between actuator 108 and platform 104 or base 102 that extends through primary lug sections 28a and 28b of side lugs 25a and 25b of clevis 18, clevis pin 19, primary axel section 38 of axel 22, and lug sections 48a and 48b of anchor lugs 35a and 35b of anchor clevis 21.

Figure 11:
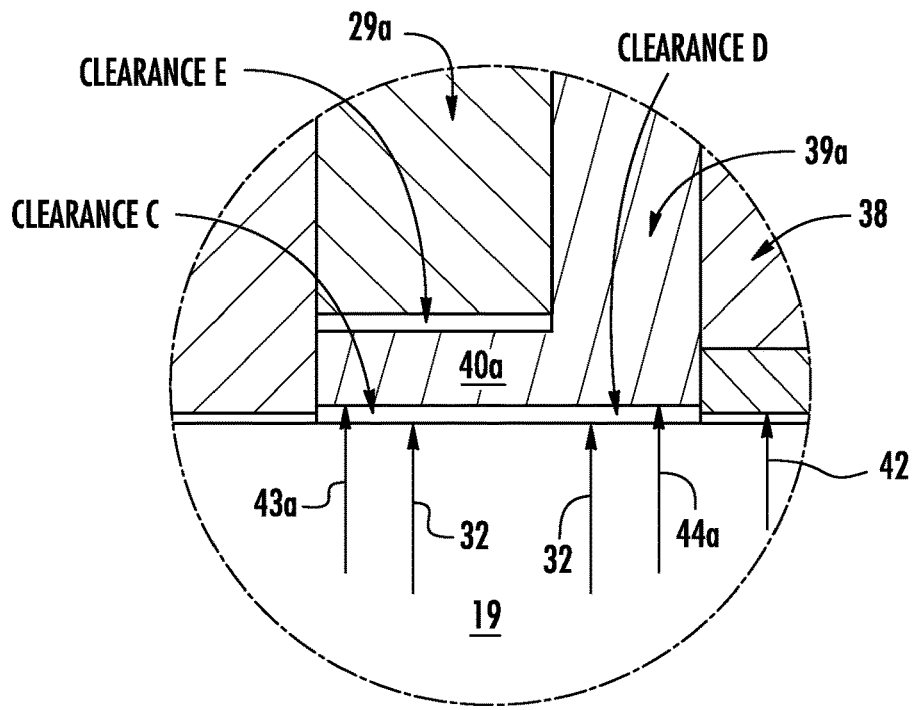
FIG. 11 is an enlarged cross-sectional view of the joint shown in FIG. 10, taken generally within the indicated circle of FIG. 10.
Figure 12:
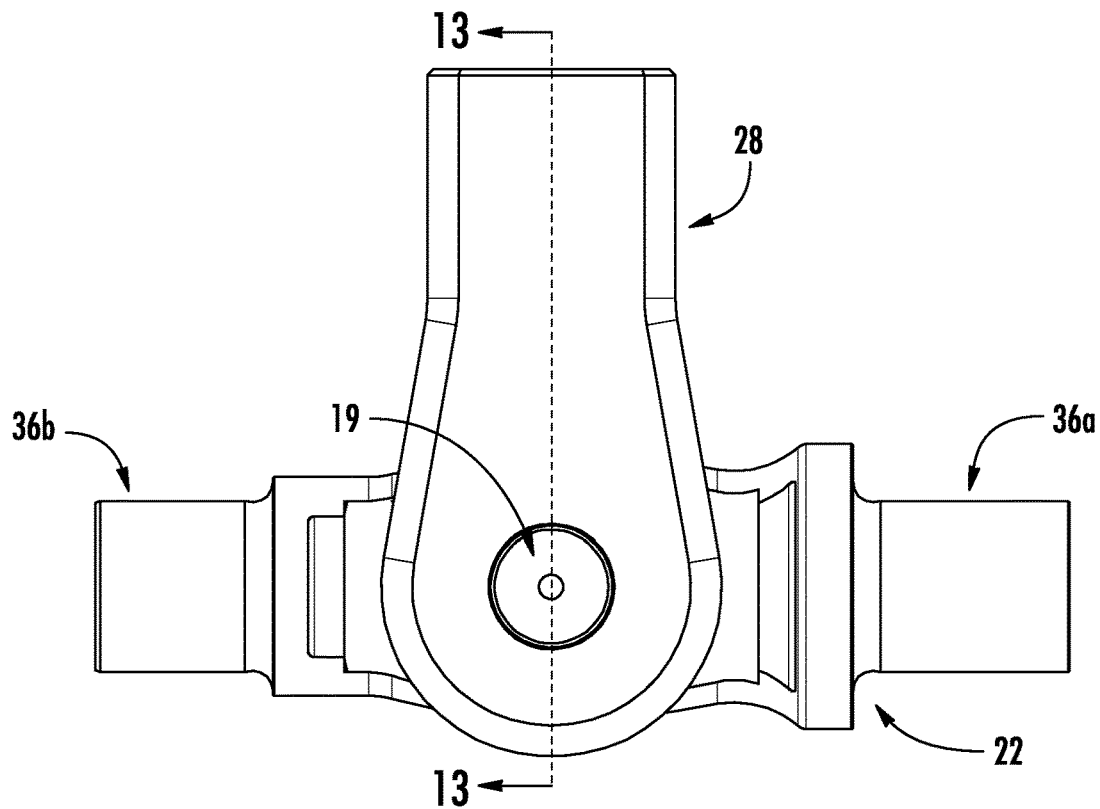
FIG. 12 is a right side view of the joint elements shown in FIG. 6.
Figure 18:
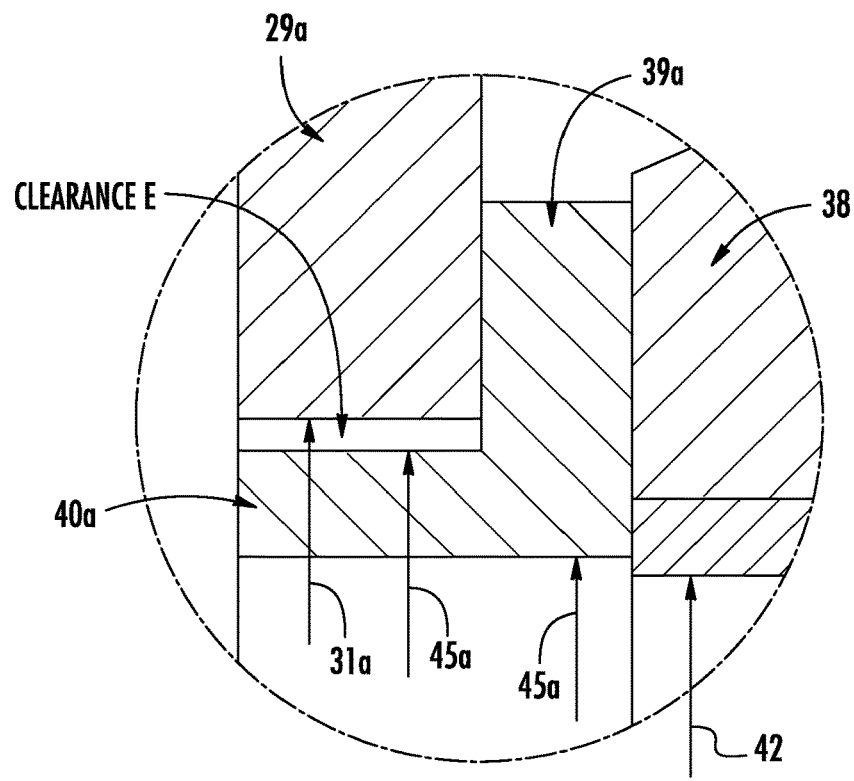
FIG. 18 is an enlarged cross-sectional view of the joint shown in FIG. 17, taken generally within the indicated circle of FIG. 13.
Figure 19:
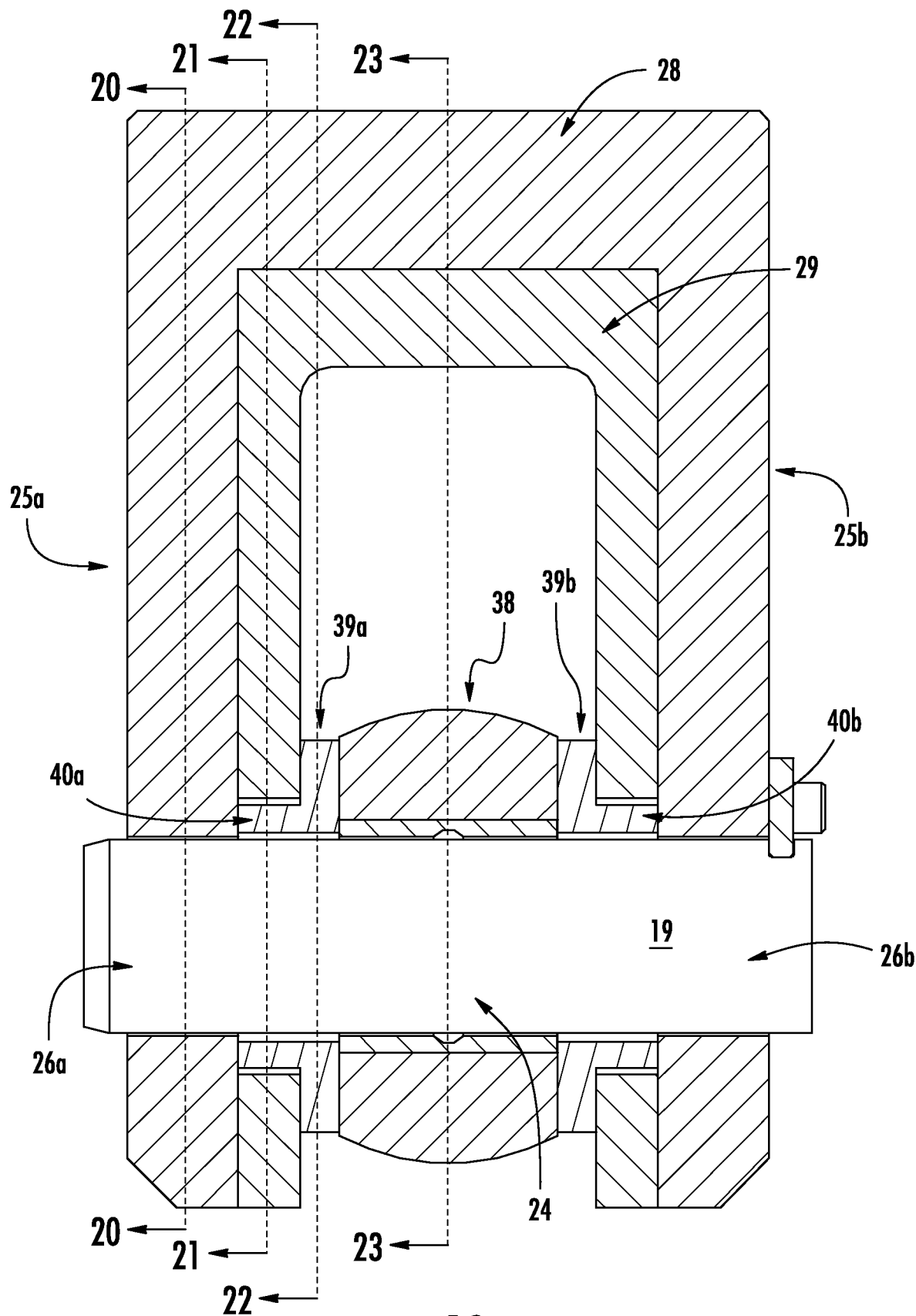
FIG. 19 is a longitudinal vertical cross-sectional view of the joint shown in FIG. 8, taken generally on line A-A of FIG. 8.
Figure 21:
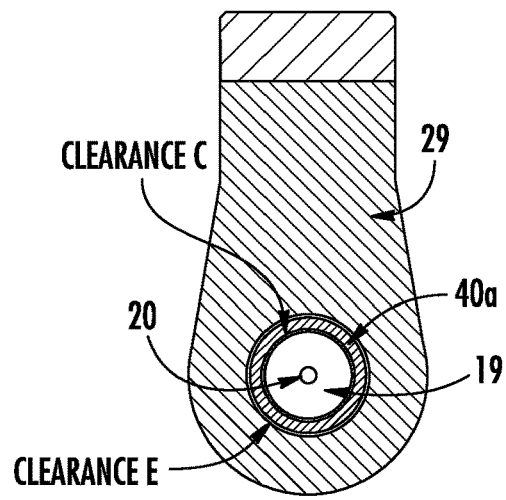
FIG. 21 is a second transverse vertical cross-sectional view of the joint shown in FIG. 19, taken generally on line E-E of FIG. 19.

As shown in FIGS. 11 and 21, a larger clearance C is provided between the inner radius 43a of annular retaining protrusion 40a of secondary axel section 39a of axel 22 and the outer radius 32 of clevis pin 19. This same clearance C is provided on the other side between the inner radius 43b of annular retaining protrusion 40b of secondary axel section 39b of axel 22 and the outer radius 32 of clevis pin 19. Clearance C is greater than clearance A. As shown in FIGS. 11, 18 and 21, a larger clearance E is also provided between the outer radius 45a of annular retaining protrusion 40a of secondary axel section 39a of axel 22 and the inner radius 31a of opening 26a in secondary lug section 29a of side lug 25a. This same clearance E is provided on the other side between the outer radius 45b of annular retaining protrusion 40b of secondary axel section 39b of axel 22 and the inner radius 31b of opening 26b in secondary lug section 29b of side lug 25b. Clearance E is greater than clearance A. For example and without limitation, clearances C and E may be 5/1000 of an inch.

As shown in FIGS. 11 and 22, a larger clearance D is provided between the inner radius 44a of secondary axel section 39a of axel 22 and the outer radius 32 of clevis pin 19. This same clearance D is provided on the other side between the inner radius 44b of secondary axel section 39b of axel 22 and the outer radius 32 of clevis pin 19. Clearance D is greater than clearance A and the same as clearance C. For example and without limitation, clearance D may be 5/1000 of an inch.

The clearances with respect to side lug 25b of clevis 18, secondary axel section 39b of axel 22, and clevis pin 19 of joints 15 and 16 are substantially identical to clearances A, B, C, D and E described above with respect to side lug 25a of clevis 18, secondary axel section 39a of axel 22, and clevis pin 19. As such, they are also the described clearances A, B, C, D and E.

As shown in FIG. 24, similarly to clearance C, a larger bearing clearance G is provided between the inner radius 61a and 61b of openings 52a and 52b in secondary lug sections 49a and 49b of anchor lugs 35a and 35b of anchor clevis 21 and the outer radius 37a and 37b of opposed ends 36a and 36b, respectively, of axel 22. Clearance G is greater than clearance F and the same as clearance C. For example and without limitation, clearance G may be 5/1000 of an inch.

When there is no fault in the primary load path described above, clearances C and E isolate annular retaining protrusions 40a and 40b of secondary axel sections 39a and 39b of axel 22 from such primary load path, clearance D isolates the remaining portion of secondary axel sections 39a and 39b of axel 22 from such primary load path, and clearance G isolates the secondary lug sections 49a and 49b of anchor lugs 35a and 35b of anchor clevis 21 from such primary load path. Thus, in normal operation, secondary axel sections 39a and 39b of axel 22 and secondary lug sections 49a and 49b of anchor lugs 35a and 35b of anchor clevis 21 are not significantly load bearing connection elements and will not wear as significantly as the primary elements in the primary load path. Accordingly, a secondary and stand-by load path is provided between actuator 108 and platform 104 or base 102 that extends through secondary lug sections 29a and 29b of side lugs 25a and 25b of clevis 18, secondary axel section 39a and 39b of axel 22, and secondary lug sections 49a and 49b of anchor lugs 35a and 35b of anchor clevis 21. Upon a failure of any of the primary lug sections 28a and 28b of side lugs 25a and 25b of clevis 18, pin 19, the primary portion 38 of axel 22, or the primary lug sections 48a and 48b of anchor lugs 35a and 35b of anchor clevis 21, for example, the load through connection joint 15 may be maintained and carried by secondary lug sections 29a and 29b of side lugs 25a and 25b of clevis 18, secondary axel section 39a and 39b of axel 22, and secondary lug sections 49a and 49b of anchor lugs 35a and 35b of anchor clevis 21. This secondary load path provides an improved level of redundancy and added level of safety to motion simulator 100.

As described above, joint connections 15 and 16 provide each of actuators 108a-108f with redundancy and fault tolerance in the control of platform 104, which is critical in certain applications. Such redundancies are provided in both degrees of freedom of the connection joint. There is no catastrophic failure resulting from pin 19 removal or failure, for example, and clevis 18, pin 19, axel 22 and anchor clevis 21 are not single point failure or safety critical parts. Simulator 100 is a redundant actuation system having multiple and preserved load paths even after an internal mechanical failure that would in other systems cause a critical failure. Motion simulator 100 can thereby be provided with no safety critical components from base 102 to flying frame 104. Furthermore, because they are isolated and not load bearing unless a failure occurs, the components that are only in the stand-by load path, namely secondary lug sections 29a and 29b of side lugs 25a and 25b of clevis 18, secondary axel section 39a and 39b of axel 22, and secondary lug sections 49a and 49b of anchor lugs 35a and 35b of anchor clevis 21, do not need to be designed for wear. These components in the stand-by load path are only engaged in the case of a failure in the primary load path.

The increased backlash resulting from larger clearance fits or gaps C, D, E and G between the mating components in the standby load path, compared to the smaller clearance fits or gaps A, B and F between the mating components in the primary load path, allows for easier detection of a failure in the primary load path, such as by audible noise as the direction of the motion coupling is revered. Visual detection of a failure is also more observable. System control software may also continuously monitor actuator performance and an abnormality may be measured and a fault warning signal may be generated.

Several modifications can be made to the disclosed embodiments. For example and without limitation, additional actuators having the functionality described above may be added to the system to provide further redundancy or fewer actuators may be employed if a system with less than six degrees of freedom is desired. Also, position sensors, accelerometers, resolvers, and/or encoders may be added to actuators and/or any other linkage joint in order to provide useful feedback to the controller. Furthermore, additional torque sensors, position sensors and/or accelerometers may be added to each actuator output and/or any other link joint in the linkage systems to provide further feedback.

Therefore, while a form of the motion simulator has been shown and described, and several modifications discussed, persons skilled in this art will readily appreciate that various additional changes may be made without departing from the scope of the invention.

What is claimed is:

1. A motion simulator comprising:
   a base;
   a platform;
   a plurality of linear actuators through which said platform is connected to said base;
   said plurality of linear actuators controllable to move said platform relative to said base in at least two degrees of freedom;
   at least one of said plurality of linear actuators connected to said platform by a platform joint having at least two degrees of freedom;
   said platform joint having a first pivot axis and a second pivot axis intersecting said first pivot axis;
   said platform joint comprising an actuator clevis, a clevis pin orientated about said first pivot axis and retained by said actuator clevis, an anchor clevis, and an axel orientated about said second pivot axis and retained by said anchor clevis;
   said axel comprising an axel opening orientated about said first pivot axis and configured to receive said clevis pin, said axel opening having a primary axel passage section defined by a primary axel inner radius, a first secondary axel passage section defined by a first secondary axel inner radius, and a second secondary axel passage section defined by a second secondary axel inner radius;
   said actuator clevis having a first side lug and a second side lug;
   said clevis pin extending between said first side lug and said second side lug of said actuator clevis;
   said axel extending between said first side lug and said second side lug of said actuator clevis and configured to rotate about said first pivot axis relative to said actuator clevis and to rotate about said second pivot axis relative to said anchor clevis;
   said axel comprising a first axel fault retaining protrusion having a first retaining outer radius and a first retaining inner radius;
   said axel comprising a second axel fault retaining protrusion having a second retaining outer radius and a second retaining inner radius;
   said first side lug comprising a first side lug opening orientated about said first pivot axis and configured to receive said clevis pin and said first axel fault retaining protrusion of said axel, said first side lug opening having a first primary lug passage section defined by a first primary lug inner radius and a first secondary lug passage section defined by a first secondary lug inner radius;
   said first side lug opening, clevis pin and first axel fault retaining protrusion configured such that a first primary lug radial clearance difference between said first primary lug inner radius of said first lug opening and an outer radius of said clevis pin is less than a first outer secondary lug radial clearance difference between said first secondary lug inner radius of said first lug and said first retaining outer radius of said first axel fault retaining protrusion.

2. The motion simulator set forth in claim 1, wherein said first side lug opening, clevis pin and first axel fault retaining protrusion are configured such that said first primary lug radial clearance difference between said first primary lug inner radius of said first lug opening and said outer radius of said clevis pin is less than a first inner secondary lug radial clearance difference between said first retaining inner radius of said first axel fault retaining protrusion and said outer radius of said clevis pin.

3. The motion simulator set forth in claim 1, wherein said first side lug opening, clevis pin and first axel fault retaining protrusion are configured such that said first primary lug radial clearance difference between said first primary lug inner radius of said first lug opening and said outer radius of said clevis pin is less than a first secondary axel radial clearance difference between said first secondary axel inner radius of said axel opening and said outer radius of said clevis pin.

4. The motion simulator set forth in claim 1, wherein said first side lug opening, clevis pin and first axel fault retaining protrusion are configured such that said first primary lug radial clearance difference between said first primary lug inner radius of said first lug opening and said outer radius of said clevis pin is substantially equal to a primary axel radial clearance difference between said primary axel inner radius of said axel opening and said outer radius of said clevis pin.

5. The motion simulator set forth in claim 1, wherein said first side lug opening and said axel are configured such that said primary axel radial clearance difference between said primary axel inner radius of said axel opening and said outer radius of said clevis pin is less than said first inner secondary lug radial clearance difference between said first retaining inner radius of said first axel fault retaining protrusion and said outer radius of said clevis pin.

6. The motion simulator set forth in claim 5, wherein said first side lug opening and said axel are be configured such that a primary axel radial clearance difference between said primary axel inner radius of said axel opening and said outer radius of said clevis pin is less than a first secondary axel radial clearance difference between said first secondary axel inner radius of said axel opening and said outer radius of said clevis pin.

7. The motion simulator set forth in claim 5, wherein said first primary lug passage section and said clevis pin comprise a single unitary formed member such that said first primary lug radial clearance difference between said first primary lug inner radius of said first lug opening and said outer radius of said clevis pin is zero.

8. The motion simulator set forth in claim 1, wherein said primary axel inner radius of said axel opening is less than said first secondary axel inner radius of said axel opening, and said second secondary axel inner radius of said axel opening is substantially equal to said first secondary axel inner radius of said axel opening.

9. The motion simulator set forth in claim 1, wherein:
said second side lug comprises a second side lug opening orientated about said first pivot axis and configured to receive said clevis pin and said second axel fault retaining protrusion of said axel, said second side lug opening having a second primary lug passage section defined by a second primary lug inner radius and a second secondary lug passage section defined by a second secondary lug inner radius;
said second side lug opening, clevis pin and second axel fault retaining protrusion configured such that such that a second primary lug radial clearance difference between said second primary lug inner radius of said second lug opening and an outer radius of said clevis pin is less than a second outer secondary lug radial clearance difference between said second secondary lug inner radius of said second lug and said second retaining outer radius of said second axel fault retaining protrusion.

10. The motion simulator set forth in claim 9, wherein said second side lug opening, clevis pin and second axel fault retaining protrusion are configured such that said second primary lug radial clearance difference between said second primary lug inner radius of said second lug opening and said outer radius of said clevis pin is less than a second inner secondary lug radial clearance difference between said second retaining inner radius of said second axel fault retaining protrusion and said outer radius of said clevis pin.

11. The motion simulator set forth in claim 10, wherein said second side lug opening, clevis pin and second axel fault retaining protrusion are configured such that said second primary lug radial clearance difference between said second primary lug inner radius of said second lug opening and said outer radius of said clevis pin is less than a second secondary axel radial clearance difference between said second secondary axel inner radius of said axel opening and said outer radius of said clevis pin and is substantially equal to a primary axel radial clearance difference between said primary axel inner radius of said axel opening and said outer radius of said clevis pin.

12. The motion simulator set forth in claim 1, wherein said at least one linear actuator has a first end and a second end opposite said first end, and wherein said first end of said at least one linear actuator is connected to said actuator clevis and said anchor clevis is connected to said platform, whereby said at least one linear actuator is pivotally connected to said platform by said platform joint.

13. The motion simulator set forth in claim 12, comprising a base joint comprising:
an actuator clevis, a clevis pin orientated about a first pivot axis and retained by said actuator clevis, an anchor clevis, and an axel orientated about an second pivot axis and retained by said anchor clevis;
said axel comprising an axel opening orientated about said first pivot axis and configured to receive said clevis pin, said axel opening having a primary axel passage section defined by a primary axel inner radius, a first secondary axel passage section defined by a first secondary axel inner radius, and a second secondary axel passage section defined by a second secondary axel inner radius;
said actuator clevis having a first side lug and a second side lug;
said clevis pin extending between said first side lug and said second side lug of said actuator clevis;
said axel extending between said first side lug and said second side lug of said actuator clevis;
said axel comprising a first axel fault retaining protrusion having a first retaining outer radius and a first retaining inner radius;
said axel comprising a second axel fault retaining protrusion having a second retaining outer radius and a second retaining inner radius;
said first side lug comprising a first side lug opening orientated about said first pivot axis and configured to receive said clevis pin and said first axel fault retaining protrusion of said axel, said first side lug opening having a first primary lug passage section defined by a first primary lug inner radius and a first secondary lug passage section defined by a first secondary lug inner radius;
said first side lug opening, clevis pin and first axel fault retaining protrusion configured such that a first primary lug radial clearance difference between said first primary lug inner radius of said first lug opening and an outer radius of said clevis pin is less than a first outer secondary lug radial clearance difference between said first secondary lug inner radius of said first lug and said first retaining outer radius of said first axel fault retaining protrusion; and
said second end of said at least one linear actuator connected to said actuator clevis of said base joint and said anchor clevis of said base joint connected to said base, whereby said at least one linear actuator is pivotally connected to said base by said base joint.

14. The motion simulator set forth in claim 1, wherein said primary axel passage section of said axel, said first secondary axel passage section of said axel, and said second secondary axel passage section of said axel comprise separate formed members that are fixed together.

15. The motion simulator set forth in claim 14, wherein said first axel fault retaining protrusion and said first secondary axel passage section of said axel comprise a first single unitary formed member that is fixed to said primary axel passage section of said axel, and said second axel fault retaining protrusion and said second secondary axel passage section of said axel comprise a second single unitary formed member that is fixed to said primary axel passage section of said axel.

16. The motion simulator set forth in claim 1, wherein said primary axel passage section of said axel, said first secondary axel passage section of said axel, said second secondary axel passage section of said axel, said first axel fault retaining protrusion of said axel, and said second axel fault retaining protrusion of said axel comprise a single unitary formed member.

17. The motion simulator set forth in claim 1, wherein said primary axel passage section of said axel comprises a first single unitary formed member, said first secondary axel passage section of said axel and said first axel fault retaining protrusion of said axel comprise a second single unitary formed member fixed to said first single unitary formed member, and said second secondary axel passage section of said axel and said second axel fault retaining protrusion of said axel comprise a third single unitary formed member fixed to said first single unitary formed member.

18. The motion simulator set forth in claim 1, wherein said first primary lug passage section of said first side lug and said first secondary lug passage section of said first side lug comprise separate formed members that are fixed together or comprise a single unitary formed member.

19. The motion simulator set forth in claim 1, wherein said axel is configured to rotate about said first pivot axis relative to said clevis pin and said clevis pin is rotationally fixed relative to said actuator clevis.

20. The motion simulator set forth in claim 1, wherein said clevis pin is configured to rotate about said first pivot axis relative to said actuator clevis and said axel is configured to rotate about said first pivot axis relative to said clevis pin or is rotationally fixed relative to said clevis pin.

21. The motion simulator set forth in claim 1, wherein:
said anchor clevis has a first anchor side lug and a second anchor side lug;
said axel extends between said first anchor side lug and said second anchor side lug of said anchor clevis;
said first anchor side lug comprises a first side lug opening orientated about said second pivot axis and configured to receive said axel, said first side lug opening having a first primary anchor lug passage section defined by a first primary anchor lug inner radius and a first secondary anchor lug passage section defined by a first secondary anchor lug inner radius; and
said first anchor side lug opening and said axel configured such that a first primary anchor lug radial clearance difference between said first primary anchor lug inner radius of said first anchor lug opening and a first anchor outer radius of said axel is less than a first secondary anchor lug radial clearance difference between said first secondary anchor lug inner radius of said first anchor lug opening and said first anchor outer radius of said axel;
said second anchor side lug comprises a second side lug opening orientated about said second pivot axis and configured to receive said axel, said second side lug opening having a second primary anchor lug passage section defined by a second primary anchor lug inner radius and a second secondary anchor lug passage section defined by a second secondary anchor lug inner radius; and
said second anchor side lug opening and said axel configured such that a second primary anchor lug radial clearance difference between said second primary anchor lug inner radius of said second anchor lug opening and a second anchor outer radius of said axel is less than a second secondary anchor lug radial clearance difference between said second secondary anchor lug inner radius of said second anchor lug opening and said second anchor outer radius of said axel.

22. A connection joint having at least two degrees of freedom comprising:
a first pivot axis and a second pivot axis intersecting said first pivot axis;
a first clevis, a second clevis, and a center crossing axel between said first clevis and said second clevis;
said center crossing axel configured to rotate about said first pivot axis relative to said first clevis and to rotate about said second pivot axis relative to said second clevis;
said first clevis and said crossing axel comprising first opposed primary rotational bearing surfaces orientated about said first pivot axis and defining a first primary radial clearance gap orientated about said first pivot axis;
said first clevis and said crossing axel comprising first opposed secondary rotational bearing surfaces orientated about said first pivot axis and defining a first secondary radial clearance gap orientated about said first pivot axis;
said first secondary radial clearance gap orientated about said first pivot axis being greater than said first primary radial clearance gap orientated about said first pivot axis;
said second clevis and said crossing axel comprising second opposed primary rotational bearing surfaces orientated about said second pivot axis and defining a second primary radial clearance gap orientated about said second pivot axis;
said second clevis and said crossing axel comprising second opposed secondary rotational bearing surfaces orientated about said second pivot axis and defining a second secondary radial clearance gap orientated about said first pivot axis;
said second secondary radial clearance gap orientated about said second pivot axis being greater than said second primary radial clearance gap orientated about said second pivot axis;
wherein said crossing axel is configured to rotate about said first pivot axis relative to said first clevis via said first opposed secondary rotational bearing surfaces upon a fault of said first opposed primary rotational bearing surfaces; and
wherein said crossing axel is configured to rotate about said second pivot axis relative to said second clevis via said second opposed secondary rotational bearing surfaces upon a fault of said second opposed primary rotational bearing surfaces.

23. The connection joint set forth in claim 22, wherein:
said first opposed primary rotational bearing surfaces orientated about said first pivot axis comprises a clevis pin retained by said first clevis and having an outer primary axel bearing surface orientated about said first pivot axis, and said crossing axel comprising an axel opening orientated about said first pivot axis and configured to receive said clevis pin and having an inner primary pin bearing surface orientated about said first pivot axis; and said first opposed secondary rotational bearing surfaces orientated about said first pivot axis comprises said crossing axel comprising an axel fault retaining protrusion having an outer secondary clevis bearing surface orientated about said first pivot axis, and a clevis fault retaining opening in said first clevis orientated about said first pivot axis and configured to receive said axel fault retaining protrusion and having an inner secondary protrusion bearing surface orientated about said first pivot axis;

said first primary radial clearance gap orientated about said first pivot axis comprises an annular radial gap between said outer primary axel bearing surface of said clevis pin and said inner primary pin bearing surface of said axel opening of said crossing axel; and said first secondary radial clearance gap orientated about said first pivot axis comprises an annular radial gap between said outer secondary clevis bearing surface of said axel fault retaining protrusion of said crossing axel and said inner secondary protrusion bearing surface of said clevis fault retaining opening in said first clevis.

24. The connection joint set forth in claim 22, wherein:

said first opposed primary rotational bearing surfaces orientated about said first pivot axis comprises a clevis pin retained by said first clevis and having an outer primary clevis bearing surface orientated about said first pivot axis, and a clevis pin opening in said first clevis orientated about said first pivot axis and configured to receive said clevis pin and having an inner primary pin bearing surface orientated about said first pivot axis;

said first opposed secondary rotational bearing surfaces orientated about said first pivot axis comprises said crossing axel comprising an axel fault retaining protrusion having an outer secondary clevis bearing surface orientated about said first pivot axis, and a clevis fault retaining opening in said first clevis orientated about said first pivot axis and configured to receive said axel fault retaining protrusion and having an inner secondary protrusion bearing surface orientated about said first pivot axis;

said first primary radial clearance gap orientated about said first pivot axis comprises an annular radial gap between said outer primary clevis bearing surface of said clevis pin and said inner primary pin bearing surface of said clevis pin opening in said first clevis; and said first secondary radial clearance gap orientated about said first pivot axis comprises an annular radial gap between said outer secondary clevis bearing surface of said axel fault retaining protrusion of said crossing axel and said inner secondary protrusion bearing surface of said clevis fault retaining opening in said first clevis.

25. The connection joint set forth in claim 22, wherein:

said second opposed primary rotational bearing surfaces orientated about said second pivot axis comprises said crossing axel having a shaft portion retained by said second clevis and having an outer primary bearing surface orientated about said second pivot axis, and a primary shaft opening in said second clevis orientated about said second pivot axis and configured to receive said outer primary bearing surface of said shaft portion of said crossing axel and having an inner primary bearing surface orientated about said second pivot axis;

said second opposed secondary rotational bearing surfaces orientated about said second pivot axis comprises said shaft portion of said crossing axel having an outer secondary bearing surface orientated about said second pivot axis, and a secondary shaft opening in said second clevis orientated about said second pivot axis and configured to receive said outer secondary bearing surface of said shaft portion of said crossing axel and having an inner secondary bearing surface orientated about said second pivot axis;

said second primary radial clearance gap orientated about said second pivot axis comprises an annular radial gap between said outer primary bearing surface of said shaft portion of said crossing axel and said inner primary bearing surface of said primary shaft opening in said second clevis; and said second secondary radial clearance gap orientated about said second pivot axis comprises an annular radial gap between said outer secondary bearing surface said shaft portion of said crossing axel and said inner secondary bearing surface of said secondary shaft opening in said second clevis.

26. The connection joint set forth in claim 22, comprising:

a base;

a platform;

a plurality of linear actuators through which said platform is connected to said base;

said plurality of linear actuators controllable to move said platform relative to said base in at least two degrees of freedom; and at least one of said plurality of linear actuators connected to said platform and/or said base by said connection joint of claim 22.

* * * * *